United States Patent
Shannon et al.

(10) Patent No.: US 7,420,680 B2
(45) Date of Patent: Sep. 2, 2008

(54) METHOD FOR DESIGNING A COLORIMETER HAVING INTEGRAL CIE COLOR-MATCHING FILTERS

(75) Inventors: Colman Shannon, Lawrenceville, NJ (US); David Slocum, Yardley, PA (US); Michael Vrhel, Sammamish, WA (US)

(73) Assignee: Datacolor Holding AG, Lucerne (CH)

( * ) Notice: Subject to any disclaimer, the term of this patent is extended or adjusted under 35 U.S.C. 154(b) by 303 days.

(21) Appl. No.: 11/281,766

(22) Filed: Nov. 16, 2005

(65) Prior Publication Data
US 2006/0103864 A1    May 18, 2006

Related U.S. Application Data

(60) Provisional application No. 60/628,416, filed on Nov. 16, 2004.

(51) Int. Cl.
*G01N 21/25* (2006.01)
*H01L 21/00* (2006.01)

(52) U.S. Cl. .................. 356/419; 356/405; 356/406; 356/416; 438/70

(58) Field of Classification Search ................. 356/416, 356/418, 419
See application file for complete search history.

(56) References Cited

U.S. PATENT DOCUMENTS

| | | | |
|---|---|---|---|
| 4,150,898 A | 4/1979 | Suga | |
| 4,547,074 A | 10/1985 | Hinoda et al. | |
| 4,764,670 A | 8/1988 | Pace et al. | |
| 4,876,167 A | 10/1989 | Snow et al. | |
| 4,923,860 A | 5/1990 | Simons | |
| 4,965,242 A | 10/1990 | DeBoer | |
| 5,144,498 A | 9/1992 | Vincent | |
| 5,166,126 A | 11/1992 | Harrison et al. | |
| 5,168,320 A | 12/1992 | Lutz et al. | |
| 5,272,518 A | 12/1993 | Vincent | |
| 5,419,990 A | 5/1995 | Wake et al. | |
| 5,521,035 A | 5/1996 | Wolk et al. | |
| 5,599,766 A | 2/1997 | Boroson et al. | |
| 5,631,703 A | 5/1997 | Hamilton, Jr. et al. | |
| 5,691,817 A | 11/1997 | Cargill et al. | |
| 5,719,074 A | 2/1998 | Hawkins et al. | |
| 5,726,805 A | 3/1998 | Kaushik et al. | |
| 5,729,360 A | 3/1998 | Kita et al. | |
| 5,871,871 A | 2/1999 | Hogan et al. | |
| 5,892,585 A | 4/1999 | Lianza et al. | |
| 5,926,282 A | 7/1999 | Knobloch et al. | |
| 5,929,432 A | 7/1999 | Yamakawa | |
| 5,963,333 A | 10/1999 | Walowit et al. | |
| 6,020,583 A | 2/2000 | Walowit et al. | |
| 6,083,649 A | 7/2000 | Takeshita et al. | |
| 6,111,300 A | 8/2000 | Cao et al. | |
| 6,147,761 A | 11/2000 | Walowit et al. | |

(Continued)

OTHER PUBLICATIONS

Sharma, G. and Trussell, J.H., "Digital Color Imaging", Jul. 1997, IEEE Transactions on Image Processing, vol. 6, No. 7.

(Continued)

*Primary Examiner*—Roy M Punnoose

(57) ABSTRACT

A method for determining the optimal colorant thicknesses for integral CIE color-matching filters is provided. According to a computational study, a four band filter of the present invention provides a best approximation to the CIE XYZ color-matching functions with the least cost.

11 Claims, 41 Drawing Sheets

U.S. PATENT DOCUMENTS

| | | | |
|---|---|---|---|
| 6,163,377 | A | 12/2000 | Boles et al. |
| 6,252,663 | B1 | 6/2001 | Cooper |
| 6,330,029 | B1 | 12/2001 | Hamilton et al. |
| 6,362,513 | B2 | 3/2002 | Wester |
| 6,365,304 | B2 | 4/2002 | Simons |
| 6,566,723 | B1 | 5/2003 | Vook et al. |
| 6,604,466 | B2 | 8/2003 | Komori et al. |
| 6,628,331 | B1 | 9/2003 | Bean |
| 6,760,475 | B1 | 7/2004 | Miller |
| 6,771,314 | B1 | 8/2004 | Bawolek et al. |
| 6,774,988 | B2 | 8/2004 | Stam et al. |
| 6,804,006 | B2 | 10/2004 | Griffus et al. |
| 6,816,262 | B1 | 11/2004 | Slocum et al. |
| 6,933,168 | B2 | 8/2005 | Bawolek et al. |
| 6,947,143 | B2 * | 9/2005 | Kritchman et al. ........... 356/416 |
| 7,095,009 | B2 * | 8/2006 | Harada et al. ............... 250/226 |
| 7,132,644 | B2 | 11/2006 | Grunert et al. |
| 2002/0003201 | A1 | 1/2002 | Yu |
| 2003/0128310 | A1 | 7/2003 | Takizawa et al. |
| 2003/0218123 | A1 * | 11/2003 | Harada et al. ............... 250/226 |
| 2004/0105265 | A1 | 6/2004 | Takizawa |
| 2005/0205765 | A1 | 9/2005 | Tan et al. |
| 2005/0206759 | A1 | 9/2005 | Fukunaga et al. |
| 2005/0207044 | A1 | 9/2005 | Oon et al. |

OTHER PUBLICATIONS

Richard F. Lyon and Paul M. Hubel, "Eyeing the Camera: into the Next Century," Imaging Science & Technology, Society for Info. Display, Color Imagery Conference, Nov. 2002, Scottsdale, AZ.

MAZeT presents True Colour for Colorimetric, Press Release, MAZeT GmbH, http://www.omino.be/vpr/layout/display/pr.asp-?PRID=7628, Aug. 26, 2004.

"True Color ICs Allow Colour Measurement To DIN 5033," MAZeT Gmb H, http://www.mazet.de/produkte/farbsensoren/mtcs/en, 2005.

"Modular Jencolour OEM Hardware Solution" MAZeT Gmb H, http://www.mazet.de/produkte/farbsensoren/mtcs/en, 2005.

"Data sheet MTCSiCS, Integral True Colour Sensor—LCC8" MAZeT Gmb H, http://www.mazet.de/produkte/farbsensoren/mtcs/en, Apr. 18, 2005.

"Data Sheet MTCSiCT, Integral True Colour Sensor—TO39" MAZeT Gmb H, http://www.mazet.de/produkte/farbsensoren/mtcs/en, Apr. 18, 2005.

"Data Sheet MTCSiCO, Integral True Color Sensor—TO39 with optics" MAZeT Gmb H, http://www.mazet.de/produkte/farbsensoren/mtcs/en, Apr. 18, 2005.

R. W. G. Hunt, Measuring Colour, second ed., pp. 178-181, Ellis Horwood Limited, 1991.

Vos, J.J., Colorimetric and photometric properties of a 2 degree fundamental observer, Color Res. & Appl. 3, 125-128 (1978).

International Search Report and Written Opinion for PCT/US2006/010724; mailing date Sep. 15, 2006; date of receipt Sep. 18, 2006; copy consists of 12 unnumbered pages.

Mark Wolski, et al., "Optimization of Sensor Response Functions for Colorimetry of Reflective and Emissive Objects," IEEE Transactions on Image Processing, IEEE Service Center, Piscataway, NJ, US, vol. 5, No. 3, Mar. 1996 XP011025973 ISSN: 1057-7149.

Engelhardt, K., et al., "Optimum Color Filters for CCD Digital Cameras" Applied Optics, OSA, Optical Society of America, Washington, DC, US, vol. 32, No. 16, Jun. 1, 1993, pp. 3015-3023, XP000345897 ISSN: 0003-6935.

International Search Report and Written Opinion for PCT/US06/10899; copy consists of 8 unnumbered pages.

Oriel Instrument Catalog, Figure 5, p. 6-23, 2000.

PCT International Search Report for PCT/US05/41628; dated Feb. 16, 2007, copy consists of 9 unnumbered pages.

* cited by examiner

100

102 — RECEIVING THE FOLLOWING INPUT:
1) Q COLORANT TRANSMISSION SPECTRA, WHERE Q IS THE NUMBER OF DIFFERENT COLORANTS AVAILABLE, (E.G. Q=6, I.E., RED, GREEN, BLUE, CYAN, MAGENTA, AND YELLOW COLORANTS);
2) PHOTODETECTOR SPECTRAL RESPONSE FUNCTION;
3) COLORIMETER OPTICS TRANSMISSION SPECTRA (FOR EXAMPLE: UV & IR FILTERS);
4) TARGET CIE-LIKE COLOR-MATCHING FUNCTIONS;
5) SPECTRAL POWER DISTRIBUTION OF VARIOUS DISPLAY MONITORS; AND
6) REFERENCE ILLUMINANT SPECTRUM FOR CALCULATION OF $L^*$, $a^*$, & $b^*$ NEEDED FOR $\Delta E$ COMPUTATION;

104 — DETERMINING OPTIMAL COLORANT THICKNESSES IN EACH CHANNEL AND OPTIMUM LINEAR COMBINATIONS OF CHANNELS FOR INTEGRAL CIE COLOR-MATCHING FILTERS

106 — PROVIDING THE FOLLOWING OUTPUT:
1) THE NUMBER OF CHANNELS, N, NEEDED TO MATCH THE CIE-LIKE TARGET FUNCTIONS;
2) THE MAXIMUM NUMBER OF COLORANT LAYERS NEEDED PER CHANNEL;
3) THE TYPE OF COLORANT NEEDED FOR EACH LAYER (FOR EXAMPLE: RED, GREEN, BLUE, CYAN, MAGENTA, OR YELLOW);
4) THE THICKNESS OF EACH OF THE COLORANT LAYERS;
5) A PLOT OF THE BEST-FIT MATCH TO THE TARGET FUNCTIONS; AND
6) QUANTITATIVE COLOR DIFFERENCE BETWEEN BEST-FIT FUNCTION $L^*$, $a^*$, & $b^*$ VALUES AND TARGET $L^*$, $a^*$, & $b^*$ VALUES.

OPTIMIZE COLORANT SELECTION & LAYER THICKNESSES & CHANNEL COEFFICIENTS FOR BEST MATCH TO TARGET COLOR-MATCHING FUNCTIONS

400

FOR ALL COMBINATIONS OF Q COLORANTS, SOLVE THE OPTIMIZATION EQUATION:

$$\max_C \{[\text{Trace}(A^T DOM(M^T DODOM+K_n)^{-1} M^T DOA] / [\text{Trace}(A^T A)]\},$$

WHERE THE COLOR FILTER TRANSMISSION MATRIX, $M = [m_1, ..., m_N]$ AND $m_i = 10^{-Hc_i}$ WHERE MATRIX H IS THE SPECTRAL DENSITIES OF THE COLORANTS AT MAXIMUM DENSITY AND $c_i$ IS THE THICKNESS OF EACH COLORANT LAYER.

THE VALUES OF THICKNESS MATRIX C ARE CONSTRAINED TO BE GREATER THAN $c_{ll}$ AND LOWER THAN $c_{ul}$; WHERE $c_{ll}$ = THE LOWER LIMIT OF THE LAYER THICKNESS (E.G., 0.5 MICRONS AND $c_{ul}$ = THE UPPER LIMIT OF THE LAYER THICKNESS (E.G., 2.0 MICRONS) THE ABOVE EQUATION OPTIMIZES THE COLORANT LAYER THICKNESSES, c.

IN THE ABOVE OPTIMIZATION EQUATION, THE MATRIX A REPRESENTS THE TARGET CIE-LIKE COLOR-MATCHING FUNCTIONS, THE MATRIX D REPRESENTS THE PHOTODETECTOR SPECTRAL RESPONSE FUNCTION, THE MATRIX O REPRESENTS THE COMBINED COLORIMETER OPTICAL ELEMENT TRANSMISSION FUNCTIONS, AND THE MATRIX $K_n$ REPRESENTS AN ESTIMATION OF SYSTEM NOISE.

402

SUBSEQUENTLY, OPTIMIZATION IS DONE TO FIND THE LINEAR COEFFICIENTS GIVEN BY MATRIX B, THAT MINIMIZE THE SUM OF THE RESIDUAL VALUES BETWEEN THE CALCULATED COLOR-MATCHING FUNCTIONS AND THE TARGET CIE-LIKE COLOR-MATCHING FUNCTIONS AS A FUNCTION OF WAVELENGTH.

FIG. 4

COMPUTE ΔE FOR TEST MONITOR SPECTRA

314

500

FOR THE NEW COLORANT LAYER STRUCTURE (I.E., COLORANT LAYER TYPE AND THICKNESS MATRIX C), COMPUTE THE MAX AND MEAN CIELAB ΔE FOR THE SPECTRAL POWER DISTRIBUTIONS OF THE VARIOUS TEST MONITORS. THE ΔE VALUE IS BETWEEN THE L*, a*, & b* VALUES OBTAINED FROM THE CALCULATED BEST-FIT COLOR-MATCHING FUNCTIONS AND THOSE VALUES FOUND USING THE TARGET CIE-LIKE FUNCTIONS.

502

CALCULATE THE L*, a*, & b* VALUES USING THE INPUT REFERENCE ILLUMINANT SPECTRUM.

TEST FOR LAYER THICKNESS VARIATION AND SORT BY A FIGURE OF MERIT VALUE

700

FOR THE (E.G.,TOP 100) BEST PERFORMING LAYER STRUCTURES, TEST THE SENSITIVITY TO LAYER THICKNESS VARIATIONS BY COMPUTING THE MAX AND MEAN $\Delta E$ VALUES, WITH EACH LAYER THICKNESS HAVING BEEN INCREASED AND DECREASED BY SOME VARIATION TOLERANCE (E.G., 0.1 MICRONS).

702

FOR A GIVEN NUMBER OF CHANNELS, N, (E.G., N = 3, 4, 5, & 6) AND A GIVEN NUMBER OF FILTER LAYERS (E.G., 1, 2, 3, OR 4), SELECT OUT THE OPTIMUM LAYER STRUCTURE FOR EACH CONFIGURATION.
FOR EXAMPLE, SELECT OUT THE OPTIMUM STRUCTURE FOR A 4 CHANNEL CONFIGURATION THAT ALLOWS UP TO 2 LAYERS FOR EACH CHANNEL; AND SELECT OUT THE OPTIMUM STRUCTURE FOR A 5 CHANNEL CONFIGURATION THAT ALLOW ONLY A SINGLE LAYER FOR EACH CHANNEL, AND SO FORTH.

704

CHOOSE THE OPTIMUM LAYER STRUCTURE BY SELECTING THE STRUCTURE THAT WAS THE LEAST SENSITIVE TO LAYER THICKNESS VARIATIONS. THIS IS DONE BY SORTING THE RESULTS FOR THE SMALLEST MAX AND MEAN $\Delta E$ VALUES COMPUTED USING THE LAYER THICKNESS VARIATION TEST.

RECEIVING THE FOLLOWING INPUTS:

N COLORANT SPECTRA (ABSORBANCE PER UNIT THICKNESS AT P WAVELENGTHS);
ENSEMBLE OF LINEAR COMBINATIONS OF MONITOR PRIMARY SPECTRA;
3XP MATRIX OF CIE-LIKE FUNCTIONS xBAR, yBAR, zBAR AT P WAVELENGTHS.
OPTICS TRANSMISSION SPECTRUM O; AND
REFERENCE ILLUMINANT SPECTRUM

904

PREFORMING THE FOLLOWING COMPUTATION:

- 1000 I. LOOP FOR MAX NUMBER OF COLORANTS PER CHANNEL
- 1002 II. LOOP FOR NUMBER OF CHANNELS
    - III. LOOP FOR ALL COMBINATIONS COLORANTS IN ALL CHANNELS
        1. OPTIMIZE FIT OF THICKNESS RECIPES IN ALL CHANNELS TO CIE-LIKE FUNCTION SPACE.
        - 1004
        2. OPTIMIZE CHANNEL COMBINATIONS TO APPROXIMATE CIE-LIKE X Y Z FUNCTIONS
        3. COMPUTE ANCILLARY METRICS FOR GOODNESS OF FIT.
        4. STORE LOOP STATE
    - END LOOP III
- END LOOP II
- END LOOP I

5. COMPARE THE OPTIMA OF ALL THE LOOP STATES (I, II, III) TO FIND THE BEST ONE.
WRITE OUTPUT
DONE

906

PROVIDING THE FOLLOWING OUTPUT:

NUMBER OF CHANNELS N;
THICKNESS RECIPES OF COLORANTS IN EACH CHANNEL; AND
MATRIX OF LINEAR COEFFICIENTS FROM CHANNELS TO CIE XYZ.

RECEIVING THE FOLLOWING INPUT:
TABULATED RECORDS, EACH CONTAINING THE FOLLOWING: N, n', CHANNEL COLORANT COMBINATIONS, LSBF RESIDUAL, MEAN CIELAB $\Delta E$, MAX CIELAB $\Delta E$, THICKNESS RECIPES $c_i$, AND COEFFICIENT MATRIX B.

1106

PERFORMING THE FOLLOWING COMPUTATION:
1. SEPARATELY SORT RECORDS IN DECREASING LSBF RESIDUAL, MEAN CIELAB $\Delta E$, MAX CIELAB $\Delta E$.
2. OF THE BEST (E.G., 50 OR 100) ON EACH SORT, SIMULATE VARIATION OF THE FILTER THICKNESS FROM THE NOMINAL VALUES, AND RECOMPUTE THE $\Delta E$ VALUES.
3. SELECT AS BEST THE RECORD LEAST SENSITIVE TO VARIATIONS.

1502

PROVIDING THE FOLLOWING OUTPUT:
WINNING RECORD, CONTAINING THE FOLLOWING: N, n', CHANNEL COLORANT COMBINATIONS, LSBF RESIDUAL, MEAN CIELAB $\Delta E$, MAX CIELAB $\Delta E$, THICKNESS RECIPES $c_i$, AND COEFFICIENT MATRIX B.

FIG. 15

Optimal three single coated filters that minimized average ΔE error and were least sensitive to filter variations (Single Coat ΔE)

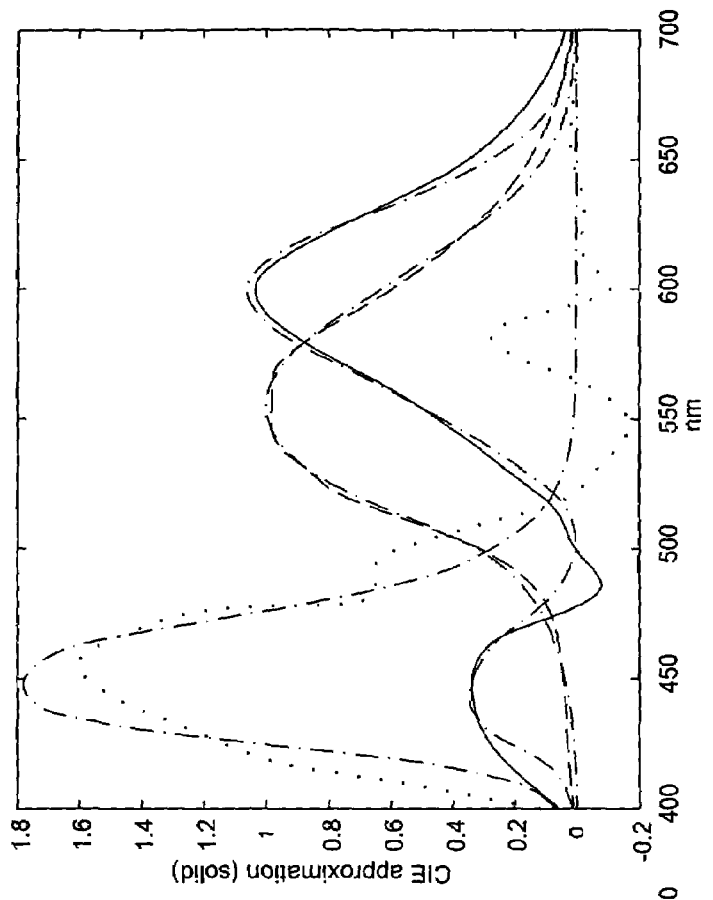
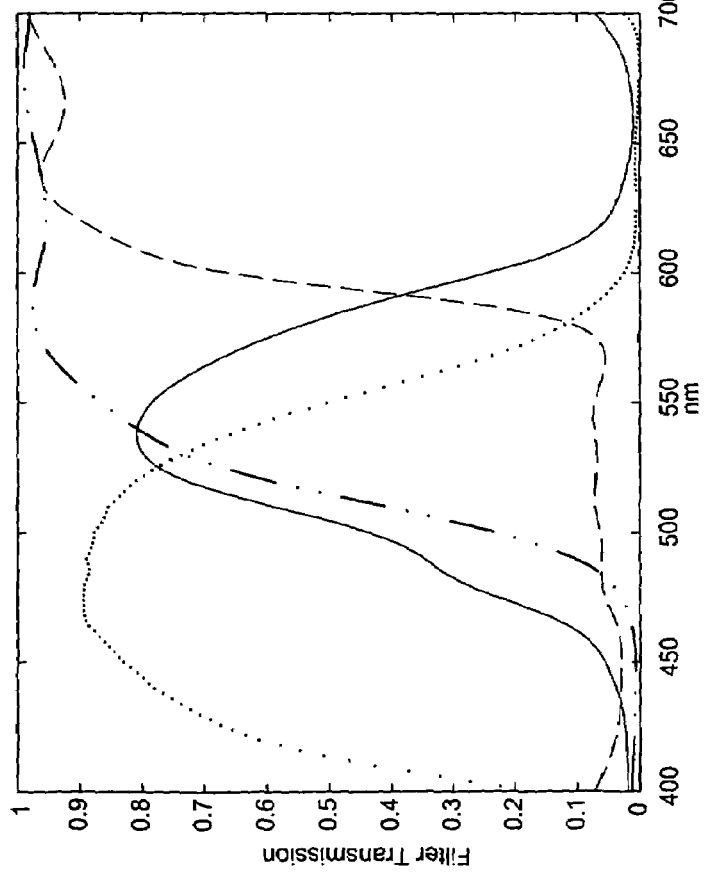
FIG. 19
Optimal four single coated filters, that minimized average ΔE error and were least sensitive to filter variations. (Single Coat ΔE)

TABLE I

ΔE RESULTS USING PROJECTION TRANSFORMATION WITH SINGLE-COATED FILTERS

| Filter Type | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 3LS | 50 | 13.743 | 6.656 | 15.221 | 7.198 |
| | 60 | 13.626 | 6.642 | 15.083 | 7.186 |
| | 70 | 13.660 | 6.638 | 15.250 | 7.167 |
| 3ΔE | 50 | 13.090 | 8.218 | 14.422 | 8.864 |
| | 60 | 13.484 | 8.174 | 14.669 | 8.816 |
| | 70 | 13.511 | 8.184 | 14.591 | 8.807 |
| 4LS | 50 | 14.309 | 6.920 | 15.764 | 8.357 |
| | 60 | 11.518 | 6.945 | 14.425 | 8.435 |
| | 70 | 11.818 | 6.915 | 14.499 | 8.409 |
| 4ΔE | 50 | 12.396 | 7.000 | 16.875 | 8.443 |
| | 60 | 12.492 | 6.987 | 14.423 | 8.416 |
| | 70 | 11.778 | 6.925 | 14.358 | 8.380 |
| 5LS | 50 | 6.426 | 3.964 | 7.602 | 4.529 |
| | 60 | 6.225 | 3.916 | 6.800 | 4.485 |
| | 70 | 5.807 | 3.900 | 6.521 | 4.481 |
| 5ΔE | 50 | 6.615 | 3.989 | 7.610 | 4.525 |
| | 60 | 5.782 | 3.902 | 6.774 | 4.485 |
| | 70 | 5.707 | 3.904 | 6.497 | 4.480 |
| 6LS | 50 | 9.652 | 4.596 | 12.145 | 5.796 |
| | 60 | 7.114 | 4.231 | 9.922 | 5.704 |
| | 70 | 6.870 | 4.223 | 9.059 | 5.644 |
| 6ΔE | 50 | 9.354 | 4.403 | 14.268 | 5.631 |
| | 60 | 7.139 | 4.230 | 9.346 | 5.711 |
| | 70 | 6.544 | 4.223 | 9.052 | 5.652 |

FIG. 25

TABLE II

ΔE RESULTS USING LMMSE TRANSFORMATION WITH SINGLE-COATED FILTERS

| Filter Type | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 3 LS | 50 | 2.707 | 0.703 | 4.034 | 0.902 |
| | 60 | 0.787 | 0.263 | 1.600 | 0.277 |
| | 70 | 0.266 | 0.078 | 0.386 | 0.088 |
| 3 ΔE | 50 | 1.724 | 0.482 | 1.812 | 0.504 |
| | 60 | 0.460 | 0.146 | 0.537 | 0.164 |
| | 70 | 0.134 | 0.045 | 0.226 | 0.055 |
| 4 LS | 50 | 2.076 | 0.610 | 3.383 | 0.713 |
| | 60 | 0.746 | 0.219 | 0.992 | 0.233 |
| | 70 | 0.208 | 0.066 | 0.328 | 0.076 |
| 4 ΔE | 50 | 2.143 | 0.737 | 3.003 | 0.785 |
| | 60 | 0.735 | 0.199 | 1.032 | 0.226 |
| | 70 | 0.266 | 0.072 | 0.302 | 0.077 |
| 5 LS | 50 | 1.136 | 0.383 | 1.764 | 0.447 |
| | 60 | 0.745 | 0.137 | 0.605 | 0.135 |
| | 70 | 0.120 | 0.038 | 0.163 | 0.043 |
| 5 ΔE | 50 | 0.950 | 0.393 | 2.002 | 0.419 |
| | 60 | 0.366 | 0.115 | 0.545 | 0.132 |
| | 70 | 0.117 | 0.038 | 0.175 | 0.044 |
| 6 LS | 50 | 1.236 | 0.462 | 2.333 | 0.502 |
| | 60 | 0.504 | 0.150 | 0.755 | 0.160 |
| | 70 | 0.136 | 0.042 | 0.229 | 0.050 |
| 6 ΔE | 50 | 1.326 | 0.457 | 2.580 | 0.514 |
| | 60 | 0.650 | 0.142 | 0.754 | 0.162 |
| | 70 | 0.134 | 0.046 | 0.238 | 0.050 |

FIG. 26

(a) Double Coated Three Filter transmittances
(b) Approximation of CIEXYZ functions with filters Optimal three double coated filters that minimized average ΔE error and were least sensitive to filter variations (Double Coat ΔE)

| COLOR | LINE STYLE |
|---|---|
| BLUE | ——— |
| RED | ········ |
| GREEN | – – – |

Optimal three double coated filters, that maximized equation (8)(Double Coat LS)

TABLE III

ΔE RESULTS USING PROJECTION TRANSFORMATION WITH DOUBLE-COATED FILTERS

| Filter Type | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 3 LS | 50 | 9.823 | 6.673 | 12.000 | 7.840 |
|  | 60 | 9.588 | 6.611 | 11.087 | 7.735 |
|  | 70 | 9.496 | 6.616 | 10.565 | 7.751 |
| 3 ΔE | 50 | 9.554 | 6.307 | 11.002 | 7.631 |
|  | 60 | 9.265 | 6.285 | 10.061 | 7.459 |
|  | 70 | 8.952 | 6.262 | 9.965 | 7.457 |
| 4 LS | 50 | 3.867 | 1.618 | 6.455 | 2.839 |
|  | 60 | 2.846 | 1.354 | 5.104 | 2.485 |
|  | 70 | 2.957 | 1.280 | 4.962 | 2.510 |
| 4 ΔE | 50 | 3.388 | 1.382 | 5.215 | 1.653 |
|  | 60 | 2.350 | 1.193 | 3.225 | 1.409 |
|  | 70 | 2.182 | 1.158 | 2.834 | 1.354 |
| 5 LS | 50 | 4.502 | 2.117 | 7.714 | 3.122 |
|  | 60 | 3.760 | 1.887 | 6.074 | 2.981 |
|  | 70 | 3.581 | 1.878 | 5.769 | 2.939 |
| 5 ΔE | 50 | 3.914 | 1.289 | 6.023 | 1.433 |
|  | 60 | 2.264 | 0.930 | 3.500 | 1.162 |
|  | 70 | 2.302 | 0.902 | 3.086 | 1.109 |

FIG. 33

TABLE IV

ΔE RESULTS USING LMMSE TRANSFORMATION WITH DOUBLE-COATED FILTERS

| Filter Type | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 3 LS | 50 | 3.849 | 1.074 | 5.424 | 1.189 |
| | 60 | 1.309 | 0.349 | 1.578 | 0.357 |
| | 70 | 0.437 | 0.104 | 0.427 | 0.119 |
| 3 ΔE | 50 | 3.637 | 1.186 | 5.923 | 1.176 |
| | 60 | 0.905 | 0.334 | 1.684 | 0.385 |
| | 70 | 0.421 | 0.116 | 0.579 | 0.124 |
| 4 LS | 50 | 2.581 | 0.865 | 4.927 | 1.010 |
| | 60 | 0.817 | 0.286 | 1.366 | 0.314 |
| | 70 | 0.274 | 0.083 | 0.471 | 0.101 |
| 4 ΔE | 50 | 4.190 | 0.838 | 4.590 | 0.929 |
| | 60 | 0.766 | 0.243 | 1.519 | 0.290 |
| | 70 | 0.302 | 0.082 | 0.467 | 0.097 |
| 5 LS | 50 | 1.958 | 0.579 | 3.619 | 0.706 |
| | 60 | 0.708 | 0.185 | 1.156 | 0.221 |
| | 70 | 0.198 | 0.063 | 0.378 | 0.072 |
| 5 ΔE | 50 | 2.287 | 0.780 | 5.049 | 0.889 |
| | 60 | 0.769 | 0.218 | 1.612 | 0.285 |
| | 70 | 0.288 | 0.072 | 0.452 | 0.089 |

FIG. 34

TABLE V

ΔE RESULTS USING PROJECTION TRANSFORMATION WITH MULTI-COATED FILTERS

| Filter Type | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 3 | 50 | 9.592 | 4.962 | 13.613 | 6.870 |
|   | 60 | 9.016 | 4.752 | 12.802 | 6.797 |
|   | 70 | 8.844 | 4.742 | 12.563 | 6.813 |
| 4 | 50 | 5.511 | 1.880 | 7.015 | 2.689 |
|   | 60 | 3.734 | 1.596 | 5.283 | 2.448 |
|   | 70 | 3.249 | 1.572 | 4.870 | 2.414 |

FIG. 37

TABLE VI

ΔE RESULTS USING LMMSE TRANSFORMATION WITH MULTI-COATED FILTERS

| Filter Type | SNR (dB) | Nominal $\Delta E_{max}$ | Nominal $\Delta E_{avg}$ | Deviation MAX $\Delta E_{max}$ | Deviation MAX $\Delta E_{avg}$ |
|---|---|---|---|---|---|
| 3 | 50 | 3.06 | 1.18 | 5.46 | 1.32 |
|   | 60 | 1.211 | 0.369 | 1.790 | 0.421 |
|   | 70 | 0.48 | 0.11 | 0.58 | 0.14 |
| 4 | 50 | 4.034 | 1.014 | 5.154 | 1.147 |
|   | 60 | 1.059 | 0.311 | 1.445 | 0.355 |
|   | 70 | 0.323 | 0.101 | 0.537 | 0.113 |

FIG. 38

TABLE VII

COATING THICKNESS IN MICRONS OF EACH COLORANT FOR SETS OF 3 FILTERS

| Filter Set | Blue | Green | Red | Cyan | Magenta | Yellow |
|---|---|---|---|---|---|---|
| Multi-Coat | 0.00 | 1.15 | 0.00 | 0.00 | 0.00 | 0.65 |
| Min ΔE | 0.00 | 0.00 | 0.00 | 0.00 | 0.00 | 1.33 |
|  | 0.00 | 0.00 | 0.00 | 2.52 | 1.48 | 0.00 |
| Single | 1.62 | 0.00 | 0.00 | 0.00 | 0.00 | 0.00 |
| Coat | 0.00 | 1.73 | 0.00 | 0.00 | 0.00 | 0.00 |
| LS | 0.00 | 0.00 | 0.00 | 0.00 | 0.00 | 1.19 |
| Single | 1.01 | 0.00 | 0.00 | 0.00 | 0.00 | 0.00 |
| Coat | 0.00 | 1.14 | 0.00 | 0.00 | 0.00 | 0.00 |
| ΔE | 0.00 | 0.00 | 1.82 | 0.00 | 0.00 | 0.00 |
| Double | 0.00 | 1.99 | 0.00 | 0.00 | 0.00 | 0.00 |
| Coat | 0.00 | 0.00 | 0.00 | 0.00 | 0.00 | 1.31 |
| LS | 0.00 | 0.00 | 0.00 | 2.75 | 1.51 | 0.00 |
| Double | 0.00 | 1.91 | 0.00 | 0.00 | 0.00 | 0.00 |
| Coat | 0.00 | 0.00 | 0.00 | 0.00 | 0.00 | 1.22 |
| ΔE | 0.00 | 0.00 | 0.00 | 2.79 | 1.51 | 0.00 |

FIG. 39

TABLE VIII

COATING THICKNESS IN MICRONS OF EACH COLORANT FOR SETS OF 4 FILTERS

| Filter Set | Blue | Green | Red | Cyan | Magenta | Yellow |
|---|---|---|---|---|---|---|
| Multi-Coat Min ΔE | 0.00 | 0.00 | 0.00 | 0.00 | 0.00 | 2.21 |
| | 0.00 | 1.08 | 0.00 | 0.00 | 0.00 | 1.69 |
| | 1.02 | 1.35 | 0.00 | 1.22 | 0.00 | 0.00 |
| | 0.00 | 0.00 | 0.00 | 2.37 | 1.63 | 0.00 |
| Single Coat LS | 0.00 | 1.89 | 0.00 | 0.00 | 0.00 | 0.00 |
| | 0.00 | 0.00 | 1.76 | 0.00 | 0.00 | 0.00 |
| | 0.00 | 0.00 | 0.00 | 1.91 | 0.00 | 0.00 |
| | 0.00 | 0.00 | 0.00 | 0.00 | 0.00 | 1.76 |
| Single Coat ΔE | 0.00 | 1.38 | 0.00 | 0.00 | 0.00 | 0.00 |
| | 0.00 | 0.00 | 1.33 | 0.00 | 0.00 | 0.00 |
| | 0.00 | 0.00 | 0.00 | 1.50 | 0.00 | 0.00 |
| | 0.00 | 0.00 | 0.00 | 0.00 | 0.00 | 1.56 |
| Double Coat LS | 0.00 | 0.00 | 0.00 | 0.00 | 0.00 | 1.13 |
| | 0.94 | 0.00 | 0.00 | 0.00 | 0.00 | 0.77 |
| | 0.00 | 1.43 | 0.00 | 0.00 | 0.00 | 1.01 |
| | 0.00 | 0.00 | 0.00 | 2.82 | 1.65 | 0.00 |
| Double Coat ΔE | 2.65 | 0.00 | 0.00 | 0.00 | 1.26 | 0.00 |
| | 0.00 | 1.75 | 0.00 | 1.29 | 0.00 | 0.00 |
| | 0.00 | 0.00 | 1.52 | 0.00 | 0.00 | 0.00 |
| | 0.00 | 0.00 | 0.00 | 0.00 | 0.00 | 1.21 |

FIG. 40

TABLE IX

COATING THICKNESS IN MICRONS OF EACH COLORANT FOR SETS OF 5 FILTERS

| Filter Set | Blue | Green | Red | Cyan | Magenta | Yellow |
|---|---|---|---|---|---|---|
| Single Coat LS ΔE | 1.60 | 0.00 | 0.00 | 0.00 | 0.00 | 0.00 |
| | 0.00 | 1.39 | 0.00 | 0.00 | 0.00 | 0.00 |
| | 0.00 | 0.00 | 1.22 | 0.00 | 0.00 | 0.00 |
| | 0.00 | 0.00 | 0.00 | 0.00 | 1.18 | 0.00 |
| | 0.00 | 0.00 | 0.00 | 0.00 | 0.00 | 1.08 |
| Single Coat | 1.95 | 0.00 | 0.00 | 0.00 | 0.00 | 0.00 |
| | 0.00 | 1.23 | 0.00 | 0.00 | 0.00 | 0.00 |
| | 0.00 | 0.00 | 1.96 | 0.00 | 0.00 | 0.00 |
| | 0.00 | 0.00 | 0.00 | 0.00 | 1.68 | 0.00 |
| | 0.00 | 0.00 | 0.00 | 0.00 | 0.00 | 1.05 |
| Double Coat LS | 0.00 | 0.00 | 0.00 | 0.00 | 0.00 | 2.00 |
| | 1.57 | 0.88 | 0.00 | 0.00 | 0.00 | 0.00 |
| | 0.70 | 0.00 | 2.20 | 0.00 | 0.00 | 0.00 |
| | 0.00 | 1.34 | 0.00 | 0.00 | 0.00 | 1.11 |
| | 0.00 | 0.00 | 0.00 | 2.71 | 1.85 | 0.00 |
| Double Coat ΔE | 0.00 | 1.58 | 0.00 | 0.00 | 0.00 | 0.00 |
| | 0.00 | 0.60 | 0.69 | 0.00 | 0.00 | 0.00 |
| | 0.00 | 1.17 | 0.00 | 0.79 | 0.00 | 0.00 |
| | 0.00 | 0.00 | 1.37 | 0.00 | 1.04 | 0.00 |
| | 0.00 | 0.00 | 0.00 | 2.82 | 1.66 | 0.00 |

FIG. 41

METHOD FOR DESIGNING A COLORIMETER HAVING INTEGRAL CIE COLOR-MATCHING FILTERS

CROSS-REFERENCES

The present application claims the benefit of Provisional Application No. 60/628,416, filed Nov. 16, 2004. The present application is related to commonly owned U.S. Pat. No. 6,163,377, issued Dec. 19, 2000. Both are herein incorporated by reference.

BACKGROUND

1. Field of the Invention

Embodiments of the present invention generally relate to optical Commission Internationale de l'Eclairage (CIE) color-matching filters and, more specifically, to a method for determining optical colorant thicknesses for deposited CIE-like color-matching filters designed through the use of varying densities of a controlled set of colorants.

2. Description of Related Art

Optical filters are used in many color-related applications, including various color measurement systems, such as colorimeters. There are many types of filters, including absorptive filters, interference filters, and others. A photoelectric tristimulus colorimeter is used to measure the color of the light emitted from a light source, such as a computer display screen. This is an emissive color measurement, but there are also reflective color measurement devices. An emissive photoelectric colorimeter directs the light source to be measured through an optical system toward three or more photoelectric detecting devices. A primary filter is positioned in front of each photoelectric detecting device. Each primary filter conforms, as close as possible, the spectral sensitivity of the photoelectric detecting device to a linear combination of the color-matching functions. A measuring device, which is connected to the photoelectric detecting devices, reads or measures the amounts of the respective primaries or tristimulus values in response to the incident light.

Although it is theoretically possible to design primary filters exactly corresponding to an ideal, it is practically impossible to manufacture primary filters having transmission factors exactly corresponding to the ideal. This is because an error is inherent in measuring primary or tristimulus values of the color sample. This error is caused by differences between actual and theoretical transmission factors of the primary filters.

Past attempts to correct this error have involved attempts to alter the transmission factor characteristics of the primary filters by forming the primary filters using a number of superimposed colored plates. However, because the spectral characteristics of the colored plates depend upon the components of the materials used in the plates—normally glass—it was generally impossible to exactly match the theoretical transmission factors. It was prohibitively difficult to accurately duplicate the theoretical transmission values over the complete wavelength range of the primaries or tristimulus values. These past attempts that increased the number of plates, undesirably decreased the amount of light received or passed through the primary filter. In addition, past attempts to fabricate primary filters by carefully superimposing a number of plates in an attempt to match theoretical transmission factors were time consuming and expensive to make.

SUMMARY

The present invention includes various embodiments of a method for designing a colorimeter having integral CIE color-matching filters, including determining optimal colorant thicknesses.

One embodiment is a method for determining the design of a solid-state color-measuring device. The solid-state color-measuring device includes light detectors and colorants. The colorants are permanently deposited onto the solid-state color-measuring device. The colorants comprise optical filters and light passes through the filters to cause the light detectors to produce output. The output of all the detectors can be combined to approximate the spectral responses of one or more CIE-like color-matching functions.

Another embodiment is a method for designing a colorimeter having integral CIE color-matching filters. A set of channels is determined from a plurality of channels. A set of filters is determined. Each filter is permanently deposited on each of the channels. Each filter is an absorptive filter and each filter has at least one layer. There is at least one channel with a double layer so that a linear combination of the set of channels matches a set of CIE-like target color-matching functions within a tolerance. Each channel integrates one or more detectors and one or more filters onto a single semiconductor device. A colorant is determined for each layer on each channel from a set of colorants. A thickness of each layer on each channel is also determined.

Yet another embodiment is a method for designing a colorimeter having integral CIE color-matching filters. Colorants and target CIE-like functions are received. Channel colorant recipes and additive mixtures of channels to match the target CIE-like functions within a tolerance are determined for a minimum number of channels and colorants per channel. Each channel is one of the channels in a colorimeter. Each channel has at least one filter covering each detector. The best solution from the channel colorant recipes and the additive mixtures of channels is provided. The best solution includes the number of channels, the thickness for each colorant in each channel, and a matrix of linear coefficients. Another embodiment is a computer-readable medium having stored thereon a plurality of instructions, the plurality of instructions including instructions which, when executed by a processor, cause the processor to perform the steps of this method.

Still another embodiment is a method for designing a colorimeter having integral CIE color-matching filters. A set of colorants for each layer of each channel of a colorimeter is determined. The colorimeter has a plurality of channels. Each channel has at least one filter covering each detector. A linear combination of the channels matches a set of CIE-like target color-matching functions to within a tolerance. A set of potential solutions is generated. The set of potential solutions includes the type of colorant for each colorant layer of each channel, the number of colorants for each channel, and the thickness of each colorant layer for each channel. A solution is selected from the set of potential solutions by minimizing the number of channels needed to match the CIE-like target color-matching functions within the tolerance, by minimizing the number of colorant layers per channel without increasing the number of channels needed to match the CIE-like target color-matching functions within the tolerance, and by minimizing deviations in performance under the influence of colorant layer thickness variations. The solution is provided and includes the number of channels, the number of colorant layers per channel, the type of colorant for each layer of each channel, and the thickness of each layer needed to match the CIE-like target color-matching functions within the tolerance. Another embodiment is a computer-readable medium having stored thereon a plurality of instructions, the plurality of instructions including instructions which, when executed by a processor, cause the processor to perform the steps of this method.

BRIEF DESCRIPTION OF THE DRAWINGS

The teachings of the present invention can be readily understood by considering the following detailed description in conjunction with the accompanying drawings, in which:

FIG. 1 is a flow chart showing an overview of an exemplary embodiment of the method for designing a colorimeter having integral CIE color-matching filters;

FIGS. 2, 3, 4, 5, 6, 7, and 8 are flow charts showing the method of FIG. 1 in more detail;

FIGS. 10, 11, 12, 13, 14, and 15 are flow charts showing the method of FIG. 9 in more detail;

FIG. 19 is a chart showing the optimal four single coated filters that minimized average $\Delta E$ error and were least sensitive to filter variations in the computational study;

FIG. 25 is a table showing error measurement ($\Delta E$) results using projection transformation with single-coated filters in the computational study;

FIG. 26 is a table showing $\Delta E$ results using linear minimum mean square error (LMMSE) transformation with single-coated filters in the computational study;

FIG. 33 is a table showing $\Delta E$ results using projection transformation with double-coated filters in the computational study;

FIG. 34 is a table showing $\Delta E$ results using LMMSE transformation with double-coated filters in the computational study;

FIG. 37 is a table showing the $\Delta E$ results using projection transformation with multi-coated filters in the computational study;

FIG. 38 is a table showing the $\Delta E$ results using LMMSE transformation with multi-coated filters in the computational study;

FIG. 39 is a table showing the coating thicknesses in microns of each colorant for sets of three filters in the computational study;

FIG. 40 is a table showing the coating thicknesses in microns of each colorant for sets of four filters in the computational study;

FIG. 41 is a table showing the coating thicknesses in microns of each colorant for sets of five filters in the computational study.

To facilitate understanding, identical reference numerals have been used, where possible, to designate identical elements that are common to the figures.

DETAILED DESCRIPTION

Figure 2:
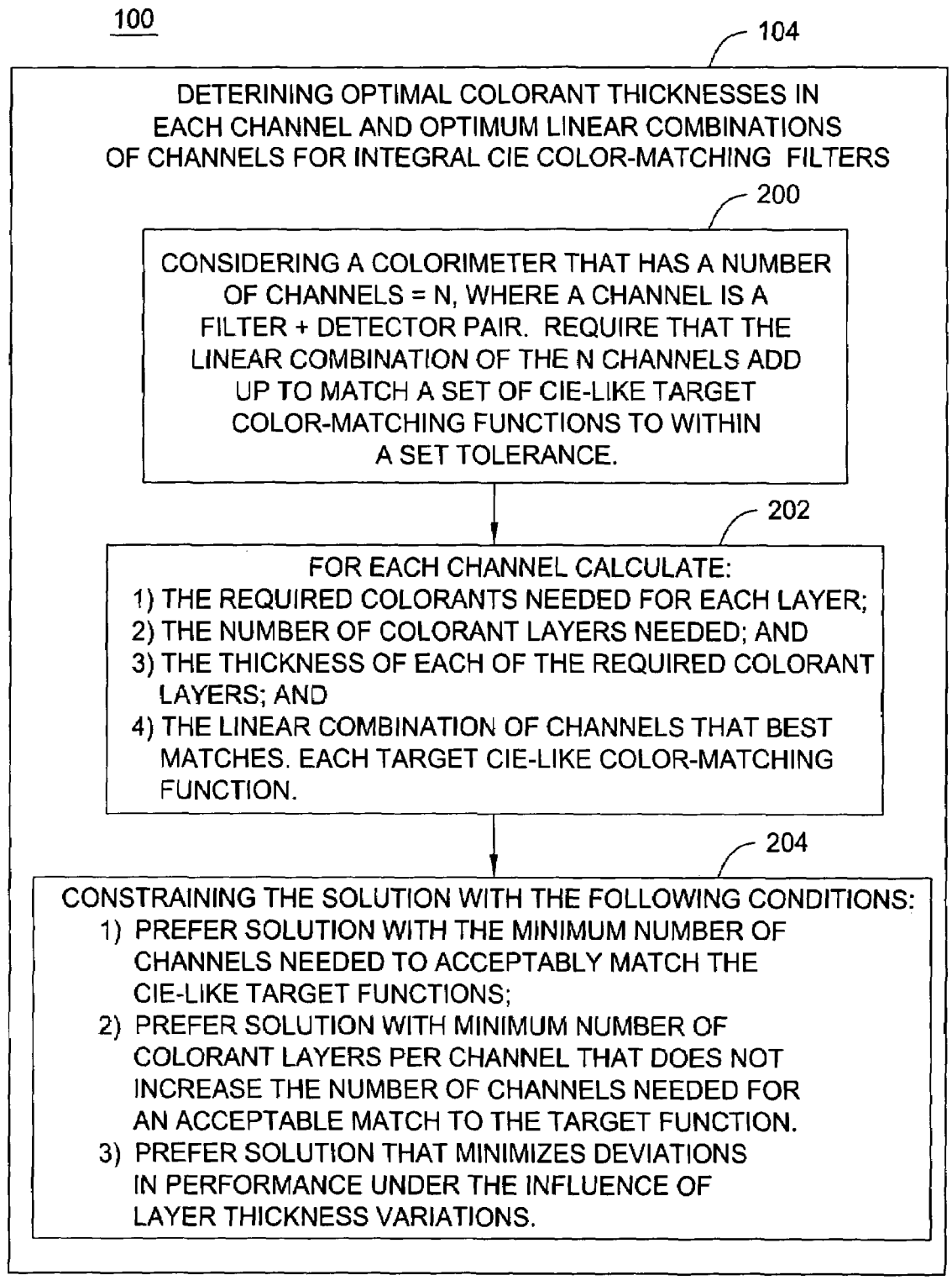

The present invention includes various embodiments of a method for designing a colorimeter having integral CIE color-matching filters, including determining optimal colorant thicknesses. Colorants include pigments, dyes, and the like. The present invention involves designing a sensor that integrated detectors and filters onto a single semiconductor chip. In one embodiment, the sensor is part of a monitor calibration device. However, embodiments of the present invention have many applications in colorimetry in addition to monitor calibration devices. Colorimetry is the science and practice of determining and specifying colors and quantitative analysis by color comparison. In colorimetry, colors can be described in numbers and physical color can be matched using a variety of measurement instruments, such as colorimeters, spectrophotometers, densitometers, and spectroradiometers. Colorimetry is used in many industries, including chemistry, color printing, textile manufacturing, paint manufacturing, graphic arts, and consumer electronics. A person of ordinary skill in the art will recognize that the present invention is applicable to many applications of colorimetry in many industries and to many kinds of measurement instruments.

One embodiment is a color-measuring device, such as a colorimeter. The colorimeter is a solid-state device having light detectors and filters. Colorants are permanently deposited onto the solid-state device using methods familiar to those of ordinary skill in the art of manufacturing solid-state light detectors. The device has an output of spectral responses that can be combined to approximate CIE or CIE-like color-matching functions. Some examples of CIE-like color-matching filters include the CIE 1931 2-degree color-matching functions, the CIE 1964 10-degree color-matching functions or modifications of the CIE functions, such as derived by D. Judd (1951) or by J. J. Vos (1978). In one embodiment, the colorants are in the form of dyes or pigments. In one embodiment, the filters include a number of colorants of various thicknesses and in various combinations. The colorants are permanently deposited onto either a single detector or a plurality of detectors on the device.

One embodiment is a method of designing such a color-measuring device. A solution of combinations of colorants is derived, where the solution maximizes the number of combinations of colorants used singly and minimizes the combinations of colorants. In one embodiment, this method if computational and may operate on a processor. In one embodiment, the method results in a selection of the best or the optimum combination of colorants according to predetermined criteria. The combination of colorants is used on the light detectors, which have known responses to light photons. The colorants are computationally selected from a larger set of colorants. The computation takes into account the combined response of the colorants and the detectors to select the best or optimum solution so that the output of the device has spectral responses that approximate CIE or CIE-like color-matching functions and so that the performance of the device meets predetermined criteria.

Monitor Calibration Device Design

A monitor calibration device designed according to an embodiment of the method for designing a colorimeter having integral CIE color-matching filters, including determining optimal colorant thicknesses, has many advantages, including a lower cost for production and calibration than existing devices, elimination of high loss optical elements, such as a diffuser and lens, and uniform characteristics due to minimal chip-to-chip variation in semiconductor fabrication.

FIG. 1 is a flow chart showing an exemplary embodiment of the method 100 for designing a colorimeter having integral CIE color-matching filters, including determining optimal colorant thicknesses. In the method 100, the following input 102 is received:

1) A set of Q colorant transmission spectra, where Q is the number of different colorants available, e.g., Q=6, i.e., red, green, blue, cyan, magenta, and yellow colorants);
2) A photodetector spectral response function;
3) A colorimeter optics transmission spectra, e.g., ultraviolet (UV) and infrared (IR) filters);
4) A set of target CIE-like color-matching functions;
5) A spectral power distribution of various display monitors; and
6) A reference illuminant spectrum for calculation of L*, a*, and b* needed for the error measurement (ΔE) computation.

At 104, the method 100 determines the optimal colorant thicknesses in each channel and the optimum linear combinations of channels for integral CIE color-matching filters. (See FIG. 2.)

In the method 100, the following output 106 is provided:
1) The number of channels, N, needed to match the CIE-like target functions;
2) The number of colorant layers needed per channel;
3) The type of colorant needed for each layer, e.g., red, green, blue, cyan, magenta, or yellow;
4) The thickness of each of the colorant layers;
5) A plot of the best-fit match to the target functions; and
6) The quantitative color difference between best-fit function, L*, a*, and b* values and target L*, a*, and b* values.

FIG. 2 shows more detail about how at 104 in FIG. 1, the optimal colorant thicknesses in each channel and the optimum linear combinations of channels for integral CIE color-matching filters are determined. At 200, a colorimeter that has a number of channels, N, is considered, where a channel has at least one filter covering each detector (e.g., 3 filters cover each detector). The calculated absorptive filter is unique to that detector that contains a single or multiple layers of colorants and also an IR filter and a UV filter that cover all detectors. It is required that the linear combination of the N channels adds up to match a set of CIE-like target color-matching functions to within a predetermined tolerance.

At 202, for each channel, the following is calculated.
1) The colorant needed for each layer;
2) The number of colorant layers needed;
3) The thickness of each of the colorant layers; and
4) The linear combination of channels that best matches each target CIE-like color-matching function.

At 204, the solution is constrained with the following conditions.
1) Prefer the solution with the minimum number of channels needed to acceptably match the CIE-like target functions;
2) Prefer the solution with the minimum number of colorant layers per channel that does not increase the number of channels needed for an acceptable match to the target function; and
3) Prefer the solution that minimizes deviations in performance under the influence of layer thickness variations.

Figure 3:
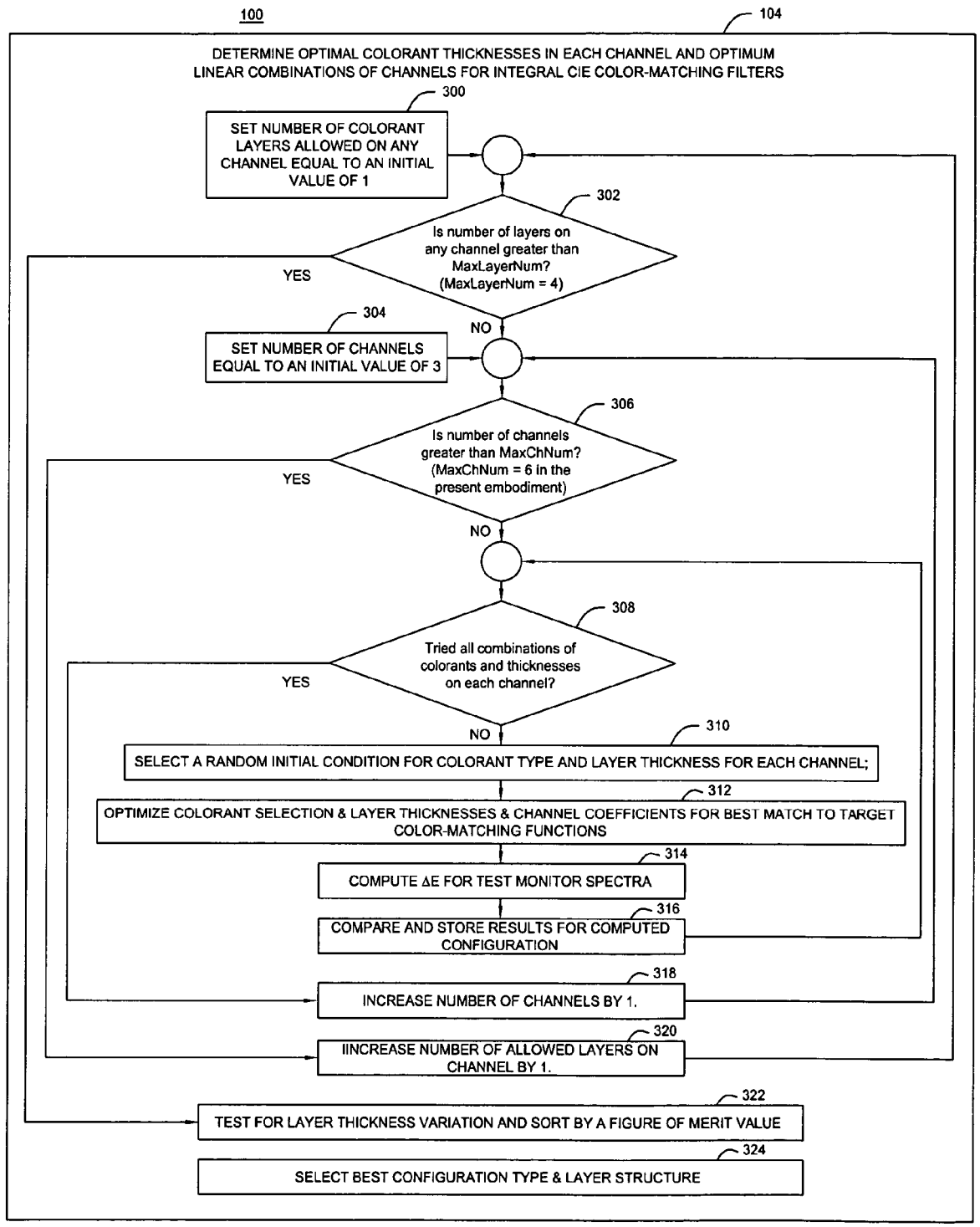

FIG. 3 is a flow chart showing even more detail than FIG. 2 about how at 104 in FIG. 1, the optimal colorant thicknesses in each channel and the optimum linear combinations of channels for integral CIE color-matching filters are determined. At 300, the number of colorant layers allowed on any channel is set equal to an initial value of 1. At 302, it is determined whether the number of layers on any channel is greater than the predetermined constant, MaxLayerNum, (e.g., MaxLayerNum=4). If so, then control flows to 322, otherwise control flows to 304. At 304, the number of channels is set to an initial value of 3. At 306, it is determined whether the number of channels is greater than the predetermined constant, MaxChNum, (e.g., MaxChNum=6). If so, then control flows to 320, otherwise control flows to 308. At 308, it is determined whether all combinations of colorants and thicknesses have been tried on each channel. If so, control flows to 318, otherwise control flows to 310. At 310, a random initial condition is selected for the colorant type and layer thickness for each channel. At 312, an optimization is performed for colorant selection and layer thicknesses and channel coefficients to find the best match to the target color-matching functions. (See FIG. 4). At 314, ΔE values are computed for the test monitor spectra. (See FIG. 5.) At 316, results are compared and stored for the computed configuration. (See FIG. 6.) At the bottom of the loop 304-318, the number of channels is increased by one and control flows from 318 back to the top of the loop at 306. At the bottom of the loop 300-320, the number of allowed layers on the channel is increased by one and control flows from 320 back to the top of the loop at 302. At 322, there is a test for layer thickness variation and a sort by a figure of merit value. (See FIG. 7.) At 324, the best configuration type and layer structure is selected. (See FIG. 8.)

FIG. 4 shows how the optimization at 312 in FIG. 3 is performed for colorant selection and layer thicknesses and channel coefficients to find the best match to the target color-matching functions. At 400, for all combinations of Q colorants, the following equation is solved.

$$\max_c\{[\text{Trace}(A^T DOM(M^T DODOM+K_n)^{-1}M^T DOA]/[\text{Trace}(A^T A)]\} \quad (1)$$

In this equation, the color filter transmission matrix, $M=[m_1, \ldots, m_N]$ and $m_i=10^{-Hc_i}$, matrix H is the spectral densities of the colorants at maximum density, each column $c_i$ of matrix c is a vector comprising the thicknesses of all the colorant layers in channel i, and the power operation is performed component-by-component. The component values of the thickness vectors $c_i$ are constrained to be greater than $c_{LL}$ and less than $c_{UL}$, where $c_{LL}$ is the lower limit of the layer thickness (e.g., 0.5 microns) and $c_{UL}$ is the upper limit of the layer thickness (e.g., 2.0 microns). Equation (1) optimizes the colorant layer thicknesses, c. In equation (1), the matrix A represents the target CIE-like color-matching functions, the matrix D represents the photodetector spectral response function, the matrix O represents the combined colorimeter optical element transmission functions, and the matrix $K_n$ represents an estimation of system noise covariance. At 402, subsequently, optimization s done to find the linear coefficients given by matrix B, that minimize the sum of the residual values between the calculated color-matching functions and the target CIE-like color-matching functions as a function of wavelength.

FIG. 5 shows how at 314 in FIG. 3 ΔE is computed for the test monitor spectra. At 500, for the new colorant layer structure (i.e., colorant layer type and thickness matrix c), the maximum and mean CIELAB ΔE for the spectral power distributions of the various test monitors are computed. The ΔE value is between the L*, a*, and b* values obtained from the calculated best-fit color-matching functions and those values found using the target CIE-like functions. At 502, the L*, a*, and b* values are calculated using the input reference illuminant spectrum.

Figure 6:
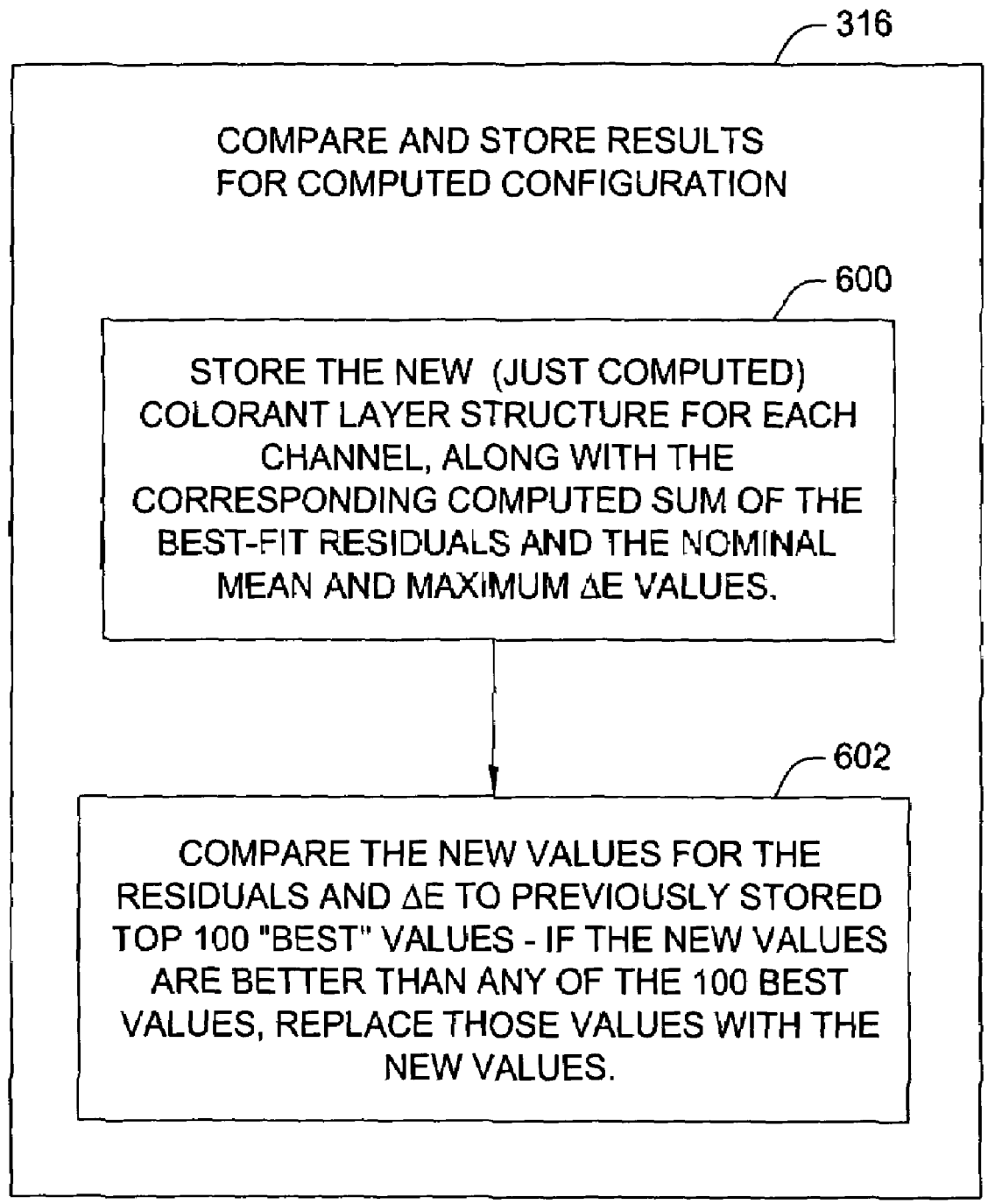

FIG. 6 shows how at 316 of FIG. 3 the results are compared and stored for the computed configuration. At 600, the new (just computed) colorant layer structure for each channel along with the corresponding computed sum of the best-fit residuals and the nominal mean and maximum ΔE values are stored. At 602, the new values for the residuals and ΔE are compared to a predetermined number of previously stored best values (e.g., the top 100). If the new values are better than any of the best values, those values are replaced with the new values.

FIG. 7 shows how the test at 322 of FIG. 3 is performed for layer thickness variation and how the sort by a figure of merit value is performed. At 700, for the best performing layer structures, the sensitivity to layer thickness variations is tested by computing the maximum and mean ΔE values, with each layer thickness having been increased and decreased by some variation tolerance (e.g., 0.1 microns). At 702, for a given number of channels, N, (e.g., N=3, 4, 5, 6) and a given number of filter layers (e.g., 1, 2, 3, or 4), the optimum layer structure is selected out for each configuration. For example, the optimum structure for a 4 channel configuration that allows up to 2 layers for each channel is selected out and the optimum structure for a 5 channel configuration that allows only a single layer for each channel is selected out, and so forth. At 704, the optimum layer structure is chosen by selecting the structure that was the least sensitive to layer thickness variations. This is done by sorting the results for the smallest maximum and mean ΔE values computed using the layer thickness variation test.

Figure 8:
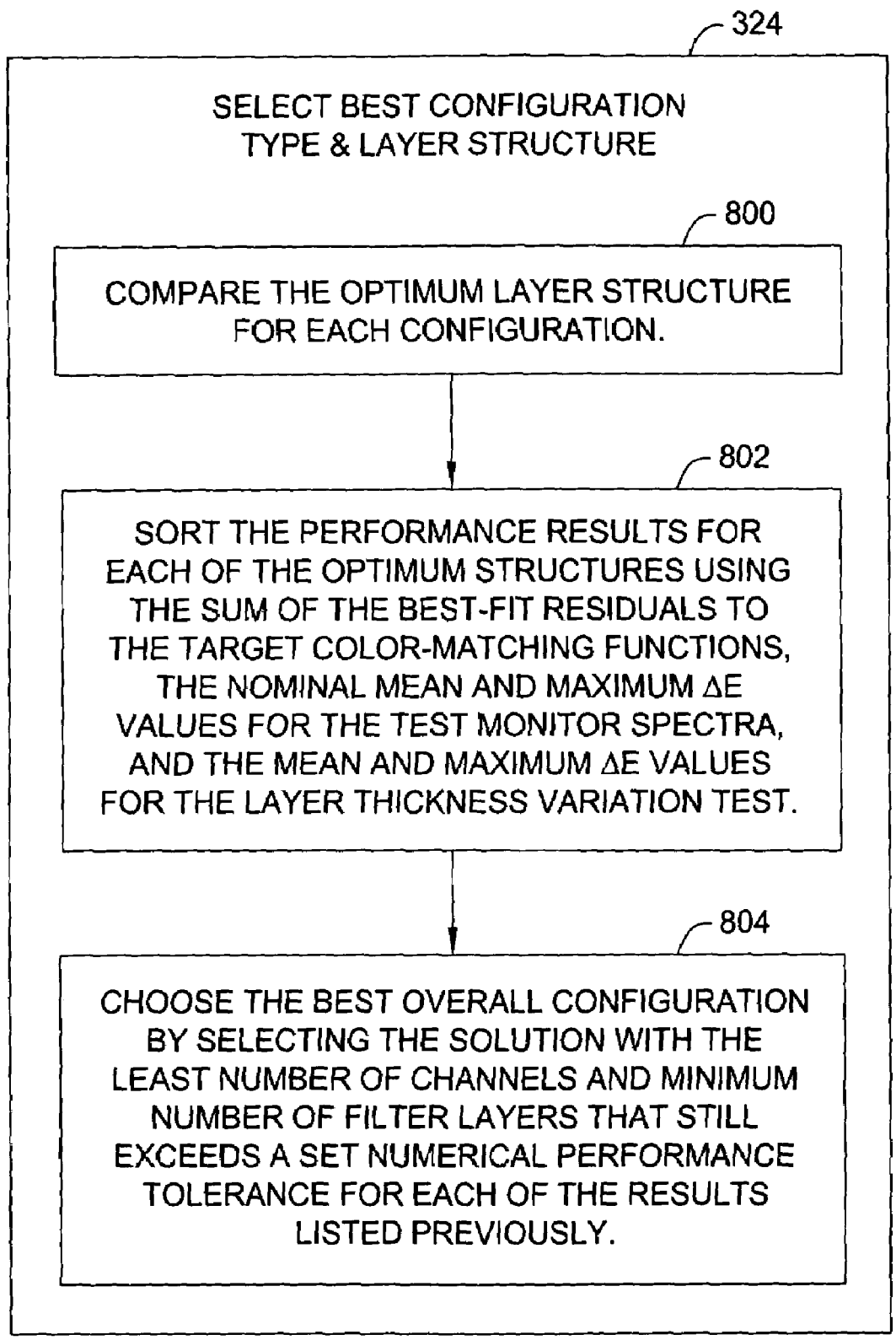

FIG. 8 shows how the selection at 324 of FIG. 3 is performed to select the best configuration type and layer structure. At 800, the optimum layer structure for each configuration is compared. At 802, the performance results for each of the optimum structures is sorted using the sum of the best-fit residuals to the target color-matching functions, the nominal mean and maximum ΔE values for the test monitor spectra, and the mean and maximum ΔE values for the layer thickness variation test. At 804, the best overall configuration is chosen by selecting the solution with the least number of channels and minimum number of filter layers that still exceeds a set numerical performance tolerance for each of the results listed previously.

Colorimeter on a Chip Using an Emissive Mode Algorithm

Figure 9:
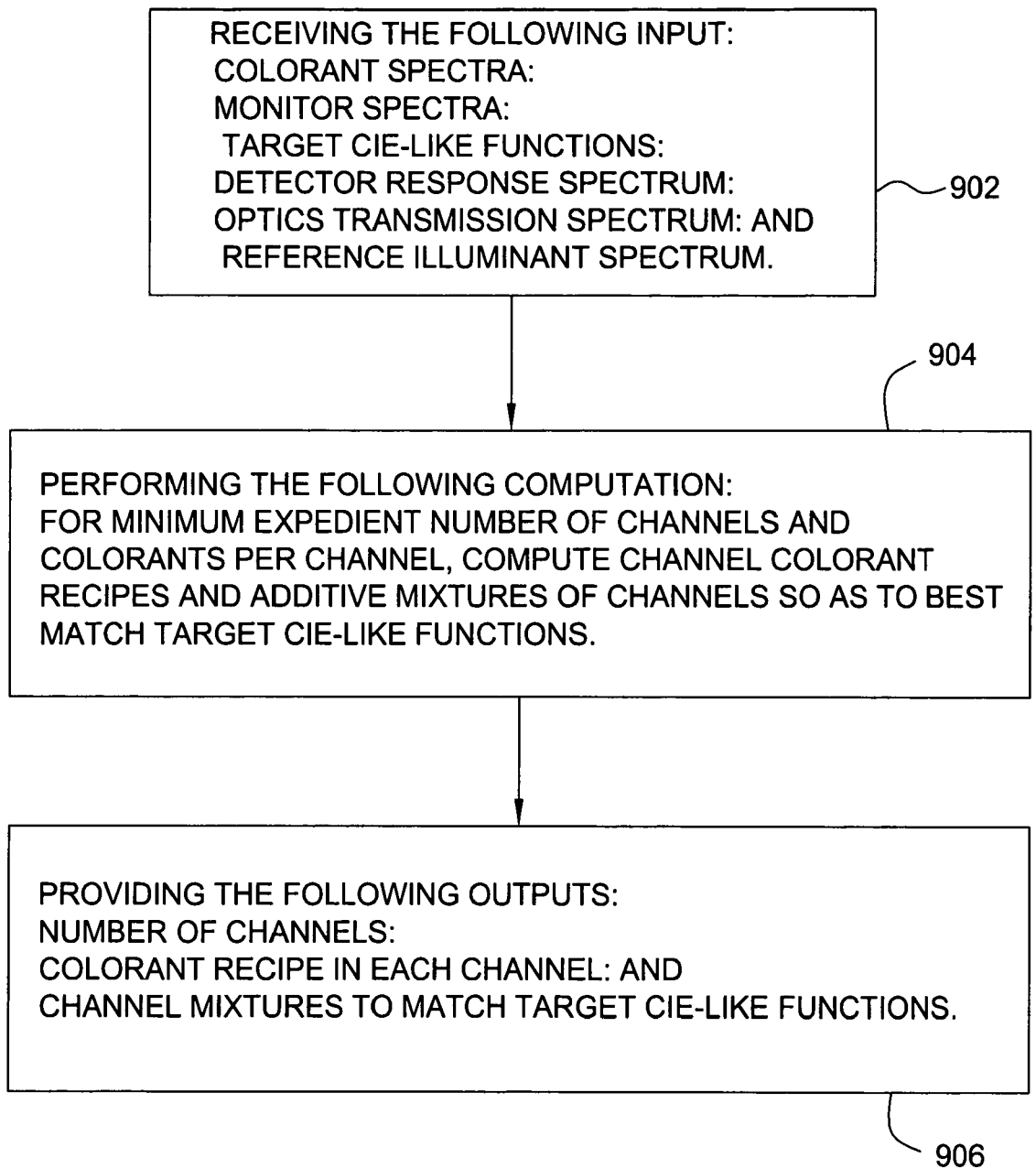
FIG. 9 is a flow chart showing an overview of another exemplary embodiment of the method for designing a colorimeter having integral CIE color-matching filters.

FIG. 9 shows an overview of another exemplary embodiment of the method for designing a colorimeter having integral CIE color-matching filters, including determining optimal colorant thicknesses. This embodiment can be used to design a colorimeter on a chip using an emissive mode algorithm. The method 900 receives the following input 902: colorant spectra, monitor spectra, target CIE-like functions, a detector response spectrum, an optics transmission spectrum, and a reference illuminant spectrum. At 904, the channel colorant recipes and additive mixtures of channels are computed so as to best match target CIE-like functions for a minimum expedient number of channels and colorants per channel. The method 900 provides the following output 906: a number of channels, the colorant recipe in each channel, and the channel mixtures to match the target CIE-like functions.

FIG. 10 shows more detail and exemplary values for how at 904 in FIG. 1, the channel colorant recipes and additive mixtures of channels are computed so as to best match target CIE-like functions for a minimum expedient number of channels and colorants per channel. More specifically, the method 900 receives the following input 902: a number, N, colorant spectra (absorbance per unit thickness at P wavelengths), an ensemble of linear combinations of monitor primary spectra, a 3×P matrix of CIE-like functions xbar, ybar, zbar at P wavelengths, an optics transmission spectrum O, and a reference illuminant spectrum. More specifically, at 904, there is a computation having three loops, loop I 1000, loop II 1002, and loop III 1004. Loop I 1000 repeats for the maximum number of colorants per channel, loop II 1002 repeats for the number of channels, and loop III 1004 repeats for all the combinations of colorants in all the channels. Inside loop III 1004, the following step are performed:
1) Optimize fit of thickness recipes in all channels to CIE-like function space;
2) Optimize channel combinations to approximate CIE-like X Y Z functions;
3) Compute ancillary metrics for goodness of fit; and
4) Store loop state.

Continuing at 904 outside the loops, the method 900 compares the optima of all the loop states (I, II, III) to find the best one and writes the following output 906: the number of channels, N, the thickness recipes of colorants in each channel, and the matrix of linear coefficients from channels to CIE XYZ.

Figure 11:
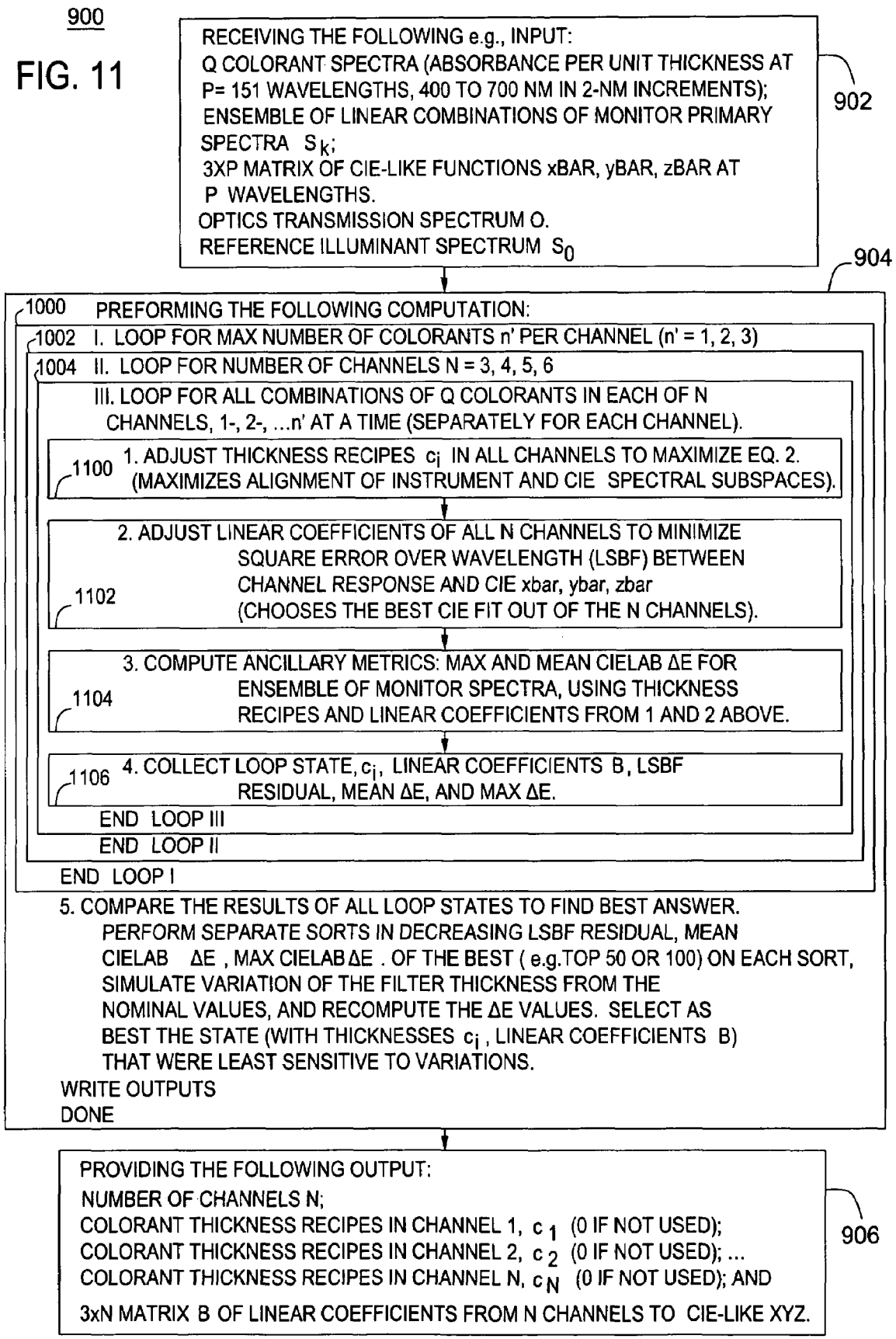

FIG. 11 shows the exemplary method 900 of FIGS. 9 and 10 in yet more detail and with additional exemplary values. The method 900 receives the following input 902: Q colorant spectra (e.g., absorbance per unit thickness at P=151 wavelengths, 400 to 700 nm in 2-nm increments), an ensemble of linear combinations of monitor primary spectra $S_k$, a 3×P matrix of CIE-like functions xbar, ybar, zbar at P wavelengths, an optics transmission spectrum O, and a reference illuminant spectrum $S_0$.

At 904, the method 900 performs a computation involving loop I 1000, loop II 1002, and loop III 1004, and then (outside the loops) compares the results of all the loop states to find the best answer. Separate sorts are performed in decreasing LSBF residual, mean CIELAB ΔE, and maximum CIELAB ΔE. Of the best (e.g., the best 50 or 100) on each sort, the variation of the filter thickness from the nominal values is simulated and the ΔE values are recomputed. The best state (with thicknesses $c_i$ and linear coefficients B) that was least sensitive to variation is selected and the output is written at 906. This book-keeping can also be done cumulatively inside loop III 1004, after step 4 1106. At 906, the following output is provided: the number of channels N, the colorant thickness recipes in channel i, $c_i$ (which is 0 if not used) for i=1 ... N and a 3×N matrix B of linear coefficients from N channels to CIE-like XYZ.

Loop I 1000 repeats for the maximum number of colorants n' per channel (e.g., n'=1, 2, 3). Loop II 1002 repeats for the number of channels N, (e.g., N=3, 4, 5, 6). Loop III 1004 repeats for all combinations of Q colorants in each of N channels 1-, 2-, ..., n' at a time separately for each channel. Inside Loop III 1004, the following steps are performed.

1) At 1100, adjust the thickness recipes $c_i$ in all channels to maximize the following equation (a repeat of Eq. 1), which maximizes alignment of instrument and CIE spectral subspaces.

$$\max_c \frac{\text{Trace}[A^T DOM(M^T DODOM + K_n)^{-1} M^T DOA]}{\text{Trace}[A^T A]} \quad (2)$$

2) At 1102, adjust linear coefficients of all N channels to minimize square error over wavelength (LSBF) between channel response and CIE xbar, ybar, zbar, which chooses the best CIE fit out of the N channels.
3) At 1104, compute ancillary metrics: max and mean CIELAB ΔE for ensemble of monitor spectra using thickness recipes and linear coefficients from steps 1 and 2.
4) At 1106, Collect loop state, $c_i$, linear coefficients B, LSBF residual, mean ΔE, and max ΔE.

Figure 12:
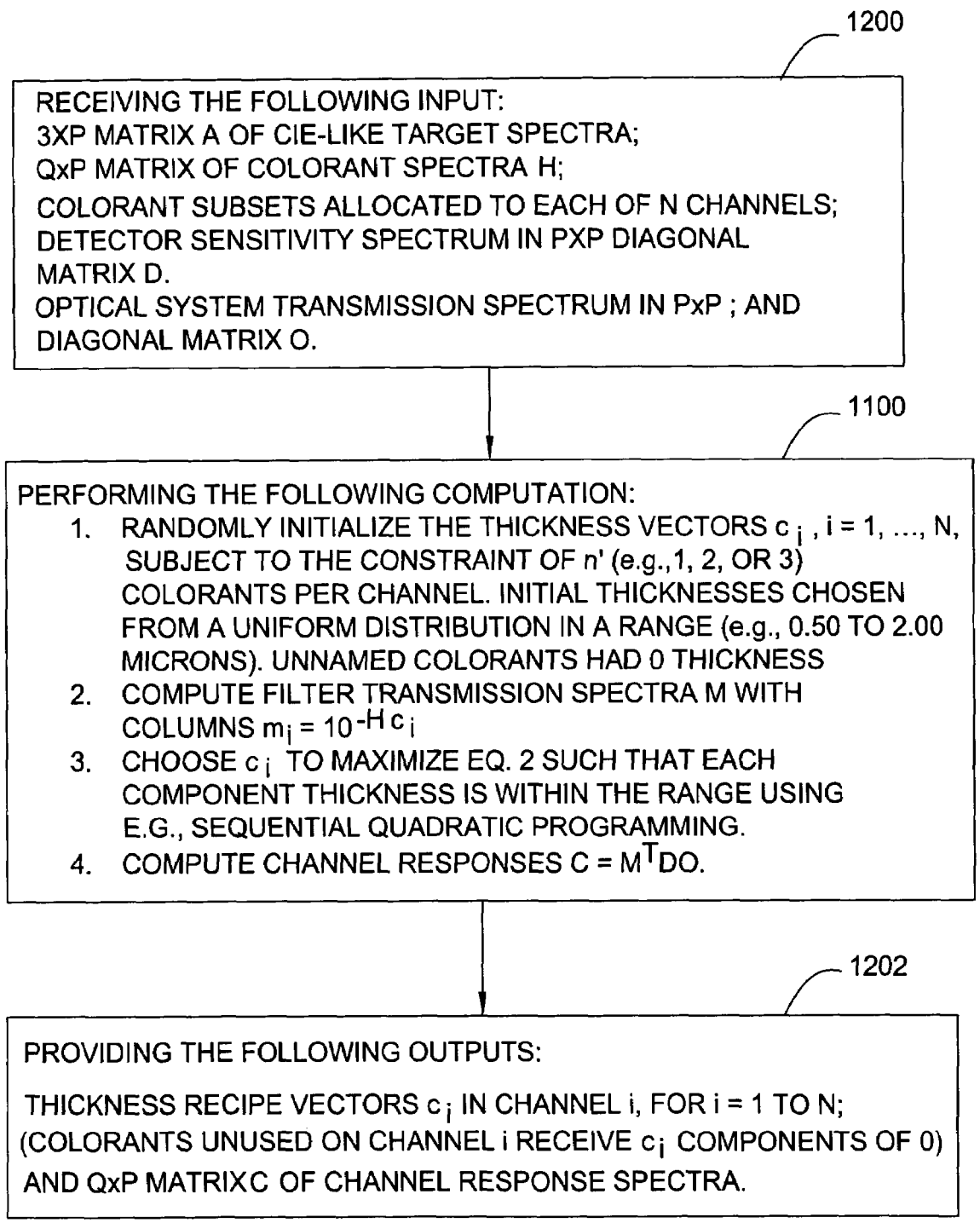

FIG. 12 shows more detail of how at step 1100 inside loop III 1004 (shown in FIG. 11) the thickness recipes are adjusted in all channels to maximize equation 2. The intermediate input 1200 to step 1100 includes the 3×P matrix A of CIE-like target spectra, the Q×P matrix of colorant spectra H, colorant subsets allocated to each of N channels, a detector sensitivity spectrum in a P×P diagonal matrix D, and an optical system transmission spectrum in a P×P diagonal matrix O. The computation at 1100 is as follows.

1) Randomly initialize the thickness vectors $c_i$, for i=1, ..., N, subject to the constraint of n' (e.g., 1, 2, or 3) colorants per channel. Initial thicknesses chosen from a uniform distribution in a range, such as about 0.5 to 3 microns.
2) Compute filter transmission spectra M with columns $m_i = 10^{-Hc_i}$.
3) Choose $c_i$ to maximize equation (2) such that each component thickness is within the range using, for example, sequential quadratic programming.
4) Compute channel responses $C = M^T DO$.

The output 1202 of computation 1100 inside loop III 1004 includes the thickness recipe vectors $c_i$ in channel i, for i=1 to N. Colorants unused on channel i receive $c_i$ components of 0. Also output is the N×P matrix C of the channel response spectra. These outputs are intermediate.

Figure 13:
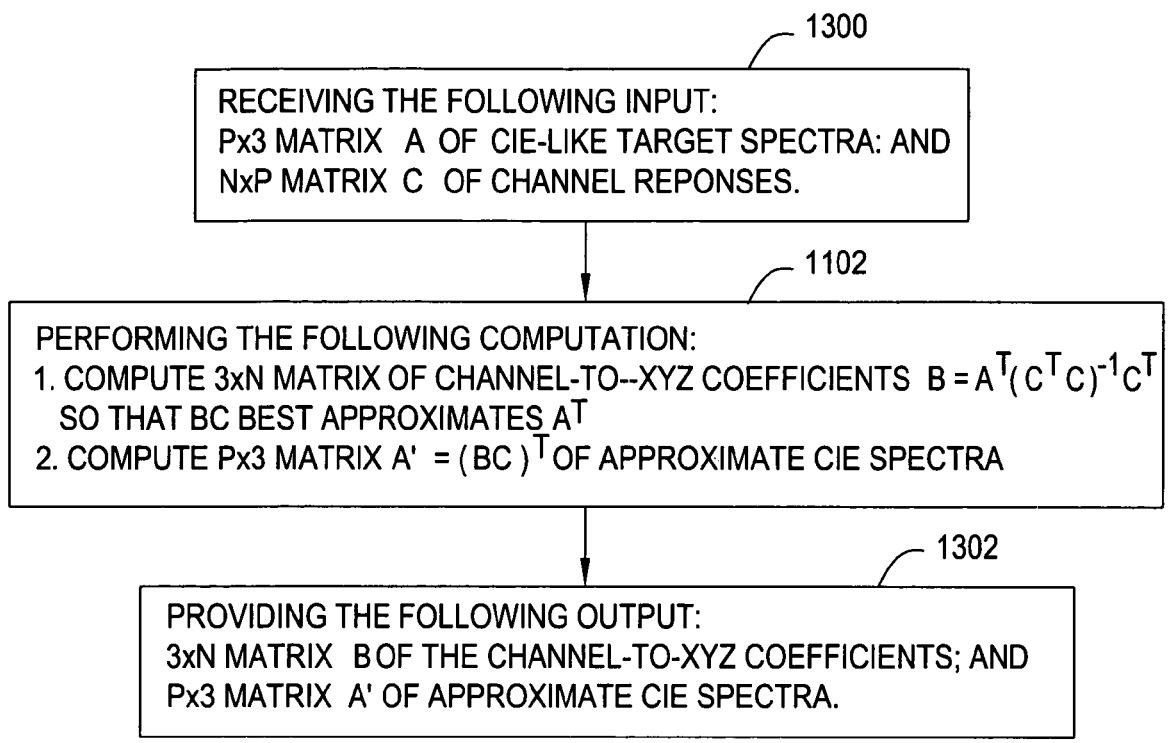

FIG. 13 shows more detail of how at step 1102 inside loop III 1004 (shown in FIG. 11) linear coefficients of all N channels are adjusted to minimize square error over wavelength (LSBF) between the combined channel response and CIE-like target functions, which chooses the best fit out of the N channels. The intermediate input 1300 includes the P×3 matrix A of CIE-like target spectra and the N×P matrix C of channel responses. The computation 1102 includes the following steps.

1) Compute 3×N matrix of channel-to-XYZ coefficients $B = A^T (C^T C)^{-1} C^T$ so that BC best approximates $A^T$.
2) Compute P×3 matrix $A' = (BC)^T$ of approximate CIE spectra.

The intermediate outputs 1302 include the 3×N matrix B of channel-to-XYZ coefficients and the P×3 matrix A' of approximate CIE spectra.

Figure 14:
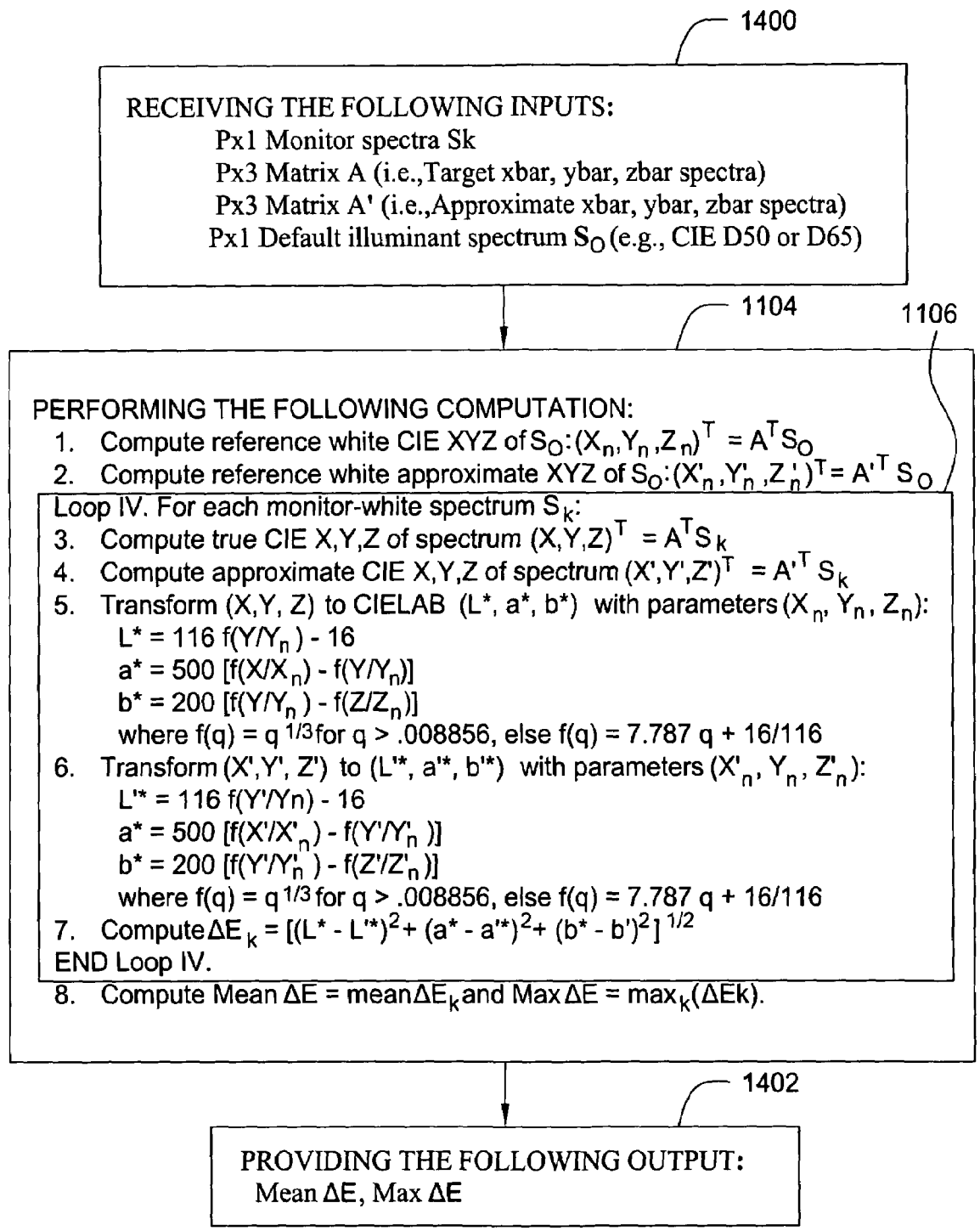

FIG. 14 shows more detail of how at step 1104 inside loop III 1004 (shown in FIG. 11) to compute ancillary metrics: maximum and mean CIELAB ΔE for ensemble of monitor spectra, using thickness recipes and linear coefficients. The intermediate input 1400 includes a P×1 monitor spectra $S_k$, a P×3 matrix A (i.e., target xbar, ybar, zbar spectra), a P×3 matrix A' (i.e., approximate xbar, ybar, zbar spectra), and a P×1 default illuminant spectrum $S_0$ (e.g., CIE D50 or D65). The computation 1104 includes the following steps, which include an inner loop IV 1106 for each monitor spectrum $S_k$ (e.g., synthetic linear combinations of primary spectra, monitor white).

1) Compute reference white CIE XYZ of $S_0$: $(X_n, Y_n, Z_n)^T = A^T S_0$.
2) Compute reference white approximate XYZ of $S_0$: $(X'_n, Y'_n, Z'_n)^T = A'^T S_0$.

Loop IV 1106, for each monitor spectrum $S_k$:
3) Compute true CIE X,Y,Z of spectrum: $(X,Y,Z)^T = A^T S_k$.
4) Compute approximate CIE X,Y,Z of spectrum: $(X',Y',Z')^T = A'^T S_k$.
5) Transform (X,Y,Z) to CIELAB (L*, a*, b*) with parameters $(X_n, Y_n, Z_n)$:

$L^* = 116 f(Y/Y_n) - 16$ $a^* = 500[f(X/X_n) - f(Y/Y_n)]$ $b^* = 200[f(Y/Y_n) - f(Z/Z_n)]$ where $f(q) = q^{1/3}$ for q>0.008856, else $f(q) = 7.787q + 16/116$.
6) Transform (X',Y',Z') to (L'*,a'*,b'*) with parameters $(X'_n, Y'_n, Z'_n)$:

$L'^* = 116 f(Y'/Y'_n) - 16$ $a^* = 500[f(X'/X'_n) - f(Y'/Y'_n)]$ $b^* = 200[f(Y'/Y'_n) - f(Z'/Z'_n)]$ where $f(q) = q^{1/3}$ for q>0.008856, else $f(q) = 7.787q + 16/116$.
7) Compute $\Delta E_k = [(L^* - L'^*)^2 + (a^* - a'^*)^2 + (b^* - b'^*)^2]^{1/2}$ End Loop IV.
8) Compute $\text{Mean}\Delta E = \text{mean}\Delta E_k$ and $\text{Max}\Delta E = \max_k \{\Delta E_k\}$.

The intermediate output 1402 includes MeanΔE and MaxΔE.

FIG. 15 shows more detail of the how at step 1106 inside loop III 1004 (shown in FIG. 11) to compare the optima of all loop states to find the best one. The intermediate input 1500 includes tabulated records, each containing the following: N, n', channel, colorant combinations, LSBF residual, mean CIELAB ΔE, max CIELAB ΔE, thickness recipes $c_i$, and coefficient matrix B. The computation 1106 includes the following steps.

1) Separately sort records in decreasing LSBF residual, mean CIELAB ΔE, max CIELAB ΔE.
2) Of the best (e.g., 50 or 100) on each sort, simulate variation of the filter thickness from the nominal values and recomputed the ΔE values.
3) Select as best the record least sensitive to variations.

The intermediate output 1502 includes the wining record, containing the following: N, n', channel colorant combinations, LSBF residual, mean CIELAB ΔE, max CIELAB ΔE, thickness recipes $c_i$, and coefficient matrix B.

Computational Study: Monitor Colorimeter Design

Another exemplary embodiment of the method for designing a colorimeter having integral CIE color-matching filters, including determining optimal colorant thicknesses, is based on results from the study for designing spectral sensitivities for a monitor colorimeter. The monitor colorimeter design achieved its color separation and approximation of the CIE color-matching functions through the use of multiple color filters. The spectral transmission of each filter was designed through the use of varying densities of a small set of dyes. A goal was to determine the optimal thickness of each dye layer as well as the number of channels necessary to achieve a desired level of colorimeter performance. The present invention is not limited to the calculated results disclosed herein.

In this computational study, the following goals were determined.

1) For a fixed number of channels, the optimal dye densities necessary to obtain the best approximation to the CIE color-matching functions were determined;
2) For a fixed number of channels and using a priori knowledge of the spectral distributions measured by a photoelectric sensor, the transformation that minimizes the CIE ΔE value between the true CIELAB value and an estimated CIELAB value was determined. The estimated value was computed from an estimated CIE XYZ value that was computed from a linear estimator of the measured values;
3) The accuracy of the device in terms of CIE ΔE for a large ensemble of spectra generated by LCD and CRT displays was simulated. This simulation included noise to model a real instrument;
4) To ensure that the best practical solution was found, filter variation effects were simulated. In this way, solutions were avoided that were overly sensitive to manufacturing variations.

The spectral sensitivity of a photoelectric sensor was modeled using a vector space notation, where the visible spectrum was sampled at P wavelengths. In this manner, an N band system was modeled according to equation the following equation.

$$m = M^T DOr + n \quad (3)$$

In equation (3), m is an N element vector that represents the measurement of each band of the instrument, M is a P by N matrix whose elements represent the spectral transmission of the N filters, D is a P by P diagonal matrix that represents the spectral sensitivity of the detector(s), O is a P by P diagonal matrix that represents the combined spectral transmission of various optical elements in the device (e.g. diffuser, IR filter etc), r is a P element vector that represents the radiant spectrum under measurement, and n is additive noise.

The instrument design was to provide accurate colorimetric measurements of the radiant spectrum r. Using the vector space notation, the CIE XYZ tristimulus values of the radiant spectrum r comprised a vector t characterized according to the following equation.

$$t = A^T r \quad (4)$$

In equation (4), A is a P by 3 matrix that represents the CIE XYZ color-matching functions.

One approach for instrument design was to select the spectral response such that $$A^T \approx B M^T DO. \quad (5)$$

In equation (5), B is a 3 by N matrix. Another approach was to consider the type of spectra for the device to measure as well as a meaningful perceptual measure, such as CIE ΔE. This approach was formulated as follows.

$$\min_{M, B} E\{\|F(t) - F(Bm)\|\} \quad (6)$$

In equation (6), E is the expected value operation, F represents the transformation from CIE XYZ to CIELAB, the measurement m depends upon the filter matrix M (see Equation 3), and matrix B is a linear estimator used for mapping from the recorded values to CIE XYZ.

There was not complete freedom in the selection of the matrix M. Instead, the matrix M was bounded by the use of filter dyes that can be layered at a specified range of densities. The relationship between a filter transmission in the matrix $M = [m_1, \ldots, m_N]$ and the density of the material is nonlinear and approximated by Beer's law, which is given by the following equation.

$$m_i = 10^{-Hc_i}. \quad (7)$$

In equation (7), H is a matrix with columns that represent the spectral densities of the dyes at maximum density, $c_i$, is a vector that represents the thicknesses of the colorant layers in channel i, and the power operation is performed element wise upon the vector $-Hc_i$.

One goal of the study was to determine the optimal vector, c, constrained by manufacturability constraints. Due to the nonlinear nature of the problems, solutions were determined numerically.

Initial investigation into finding a set of appropriate filters revealed the following. The filter dyes that were available could be selected to come very close to satisfying equation (5). Good performance that was achieved by solving for the optimal dye densities necessary to obtain the best approximation to the CIE color-matching functions for a fixed number of channels created a much more useful color measuring instrument, since it was not biased towards measuring a particular set of currently available CRT and LCD primaries. The numerical approach was sensitive to initial conditions. That is, there were local minima in the optimization problem. The range of thickness values for the filter coatings was not continuous, because it took a range of values, such as about {0, [0.5 3]} microns. This is often a problem for numerical optimization methods. These initial findings led to an iterative method for solving the dye densities necessary to obtain the best approximation to the CIE color-matching functions for a fixed number of channels.

Figure 16:
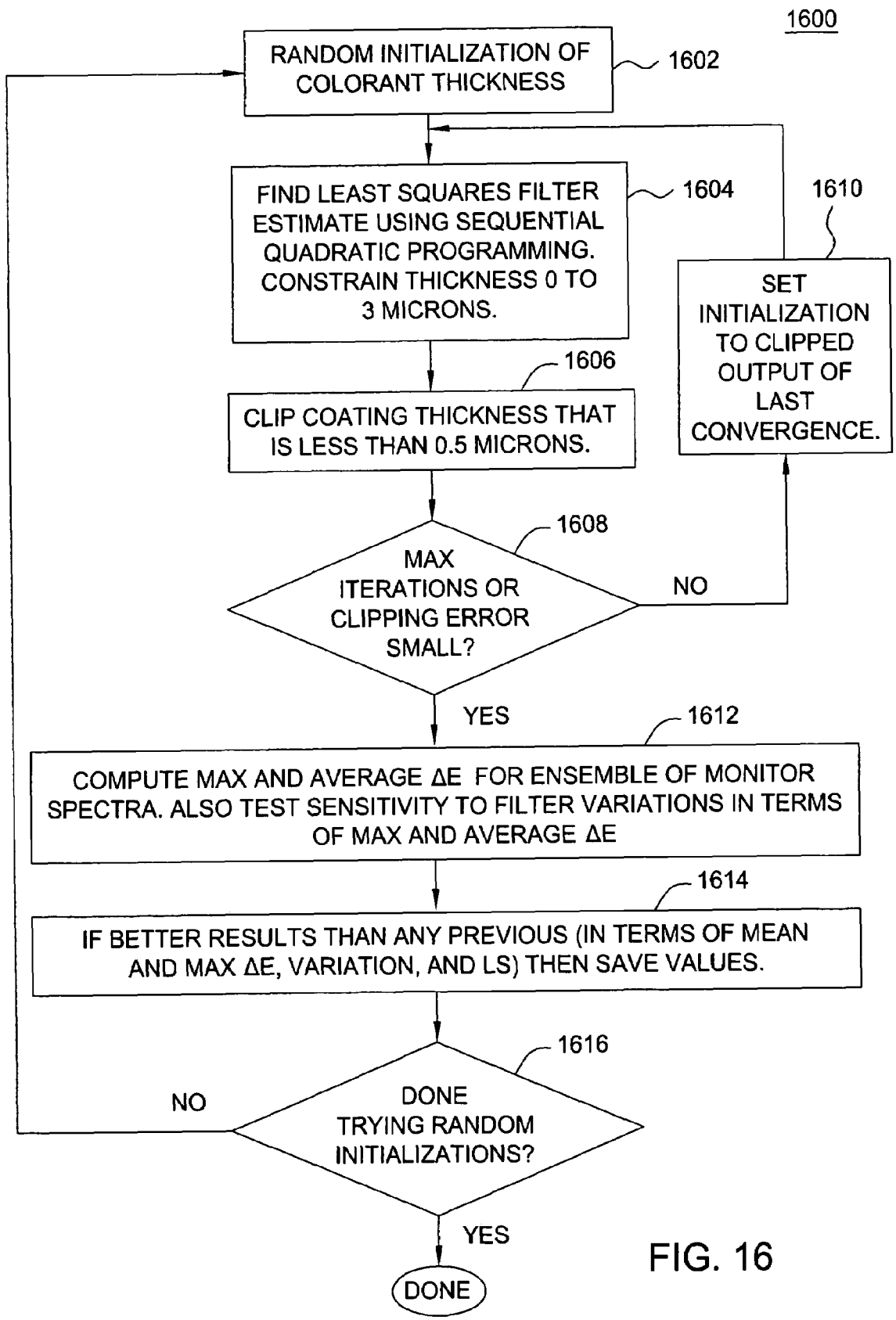
FIG. 16 is a flow diagram showing an overview of yet another exemplary embodiment of the method for designing a colorimeter having integral CIE color-matching filters.
Figure 17:
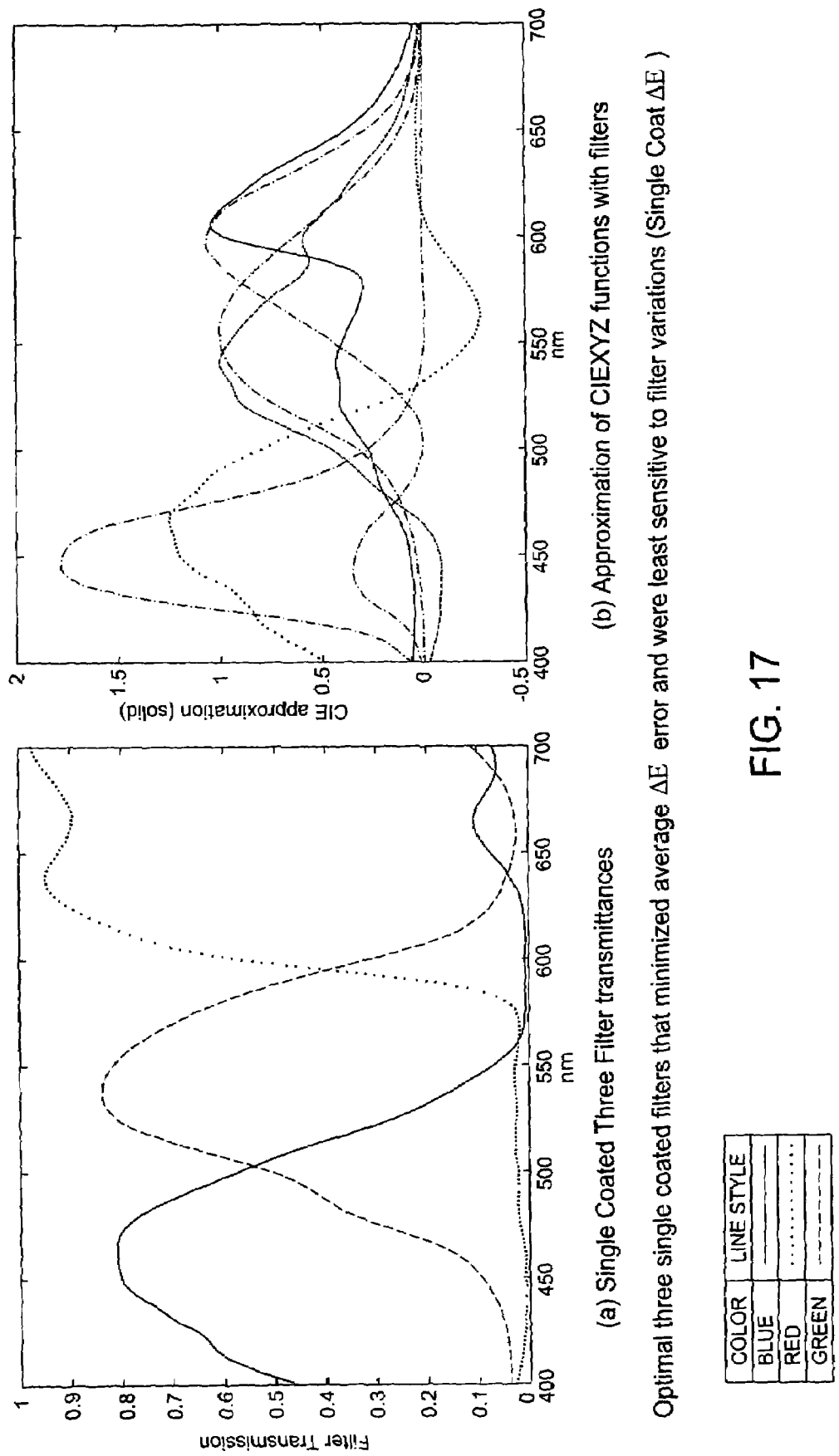
FIG. 17 is a chart showing the optimal three single coated filters that minimized average $\Delta E$ error and were least sensitive to filter variations in a computational study.
Figure 18:
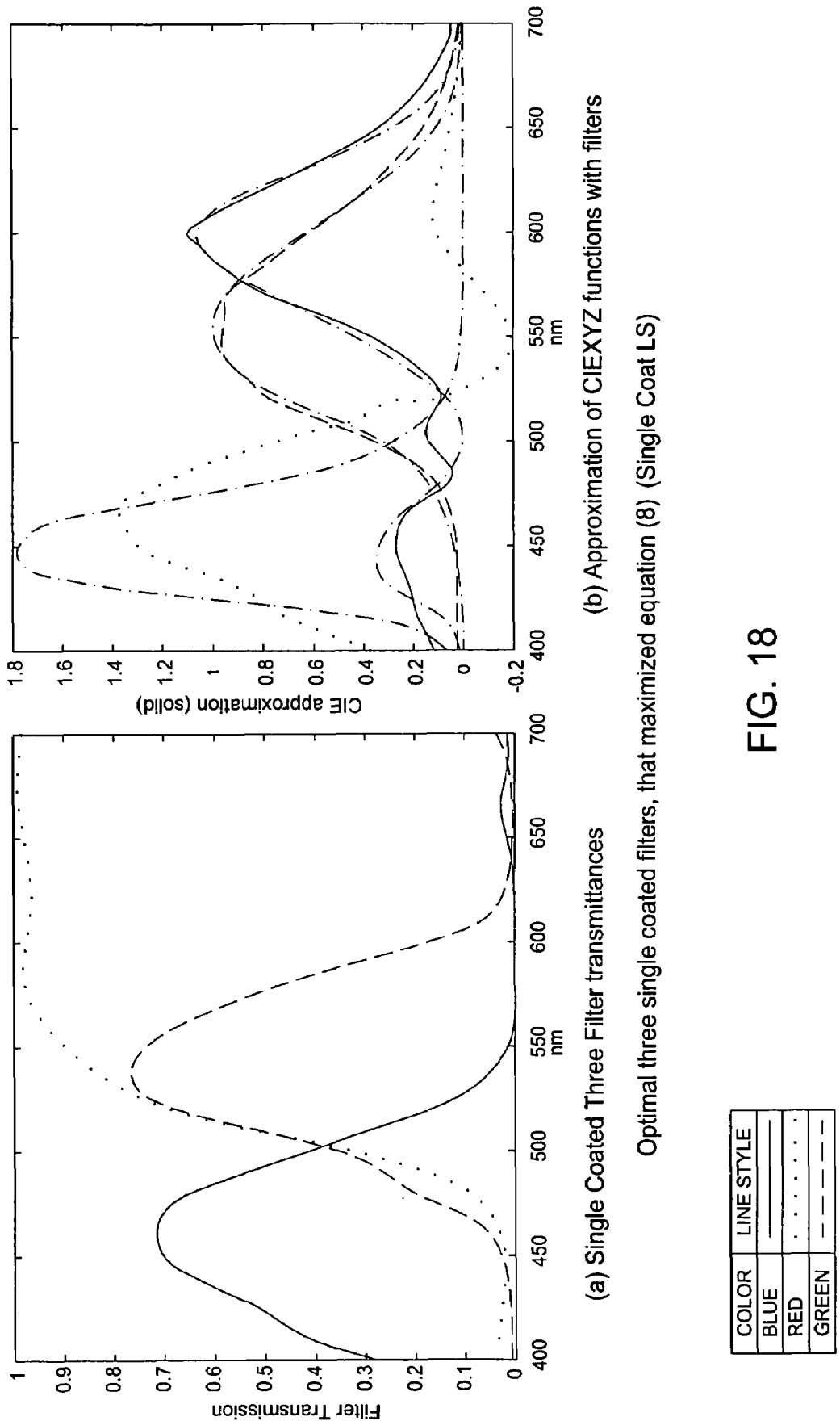
FIG. 18 is a chart showing the optimal three single coated filters that maximized the optimization equation in the computational study.
Figure 20:
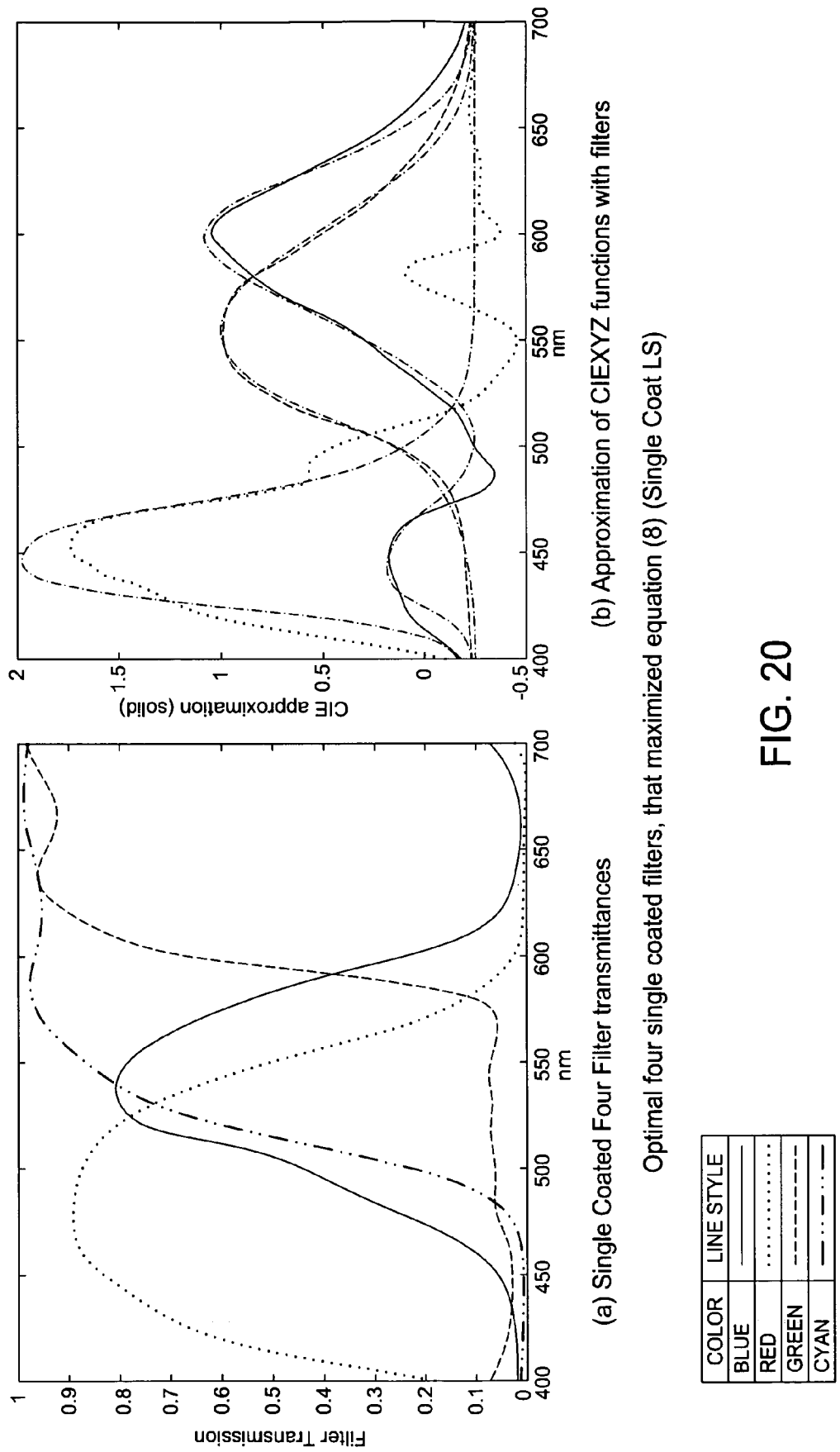
FIG. 20 is a chart showing the optimal four single coated filters that maximized the optimization equation of the present invention in the computational study.
Figure 21:
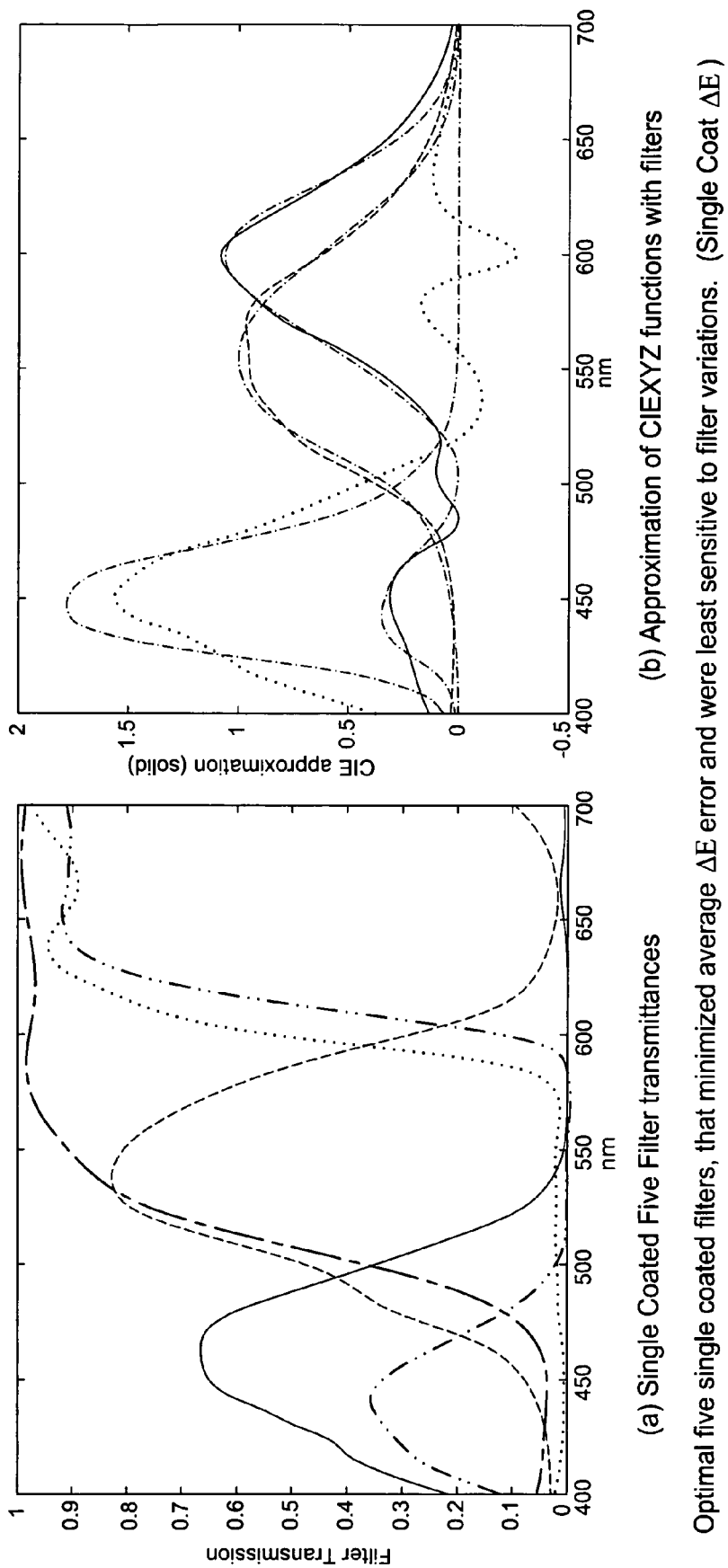
FIG. 21 is a chart showing the optimal five single coated filters that minimized average $\Delta E$ error and were least sensitive to filter variations in the computational study.
Figure 22:
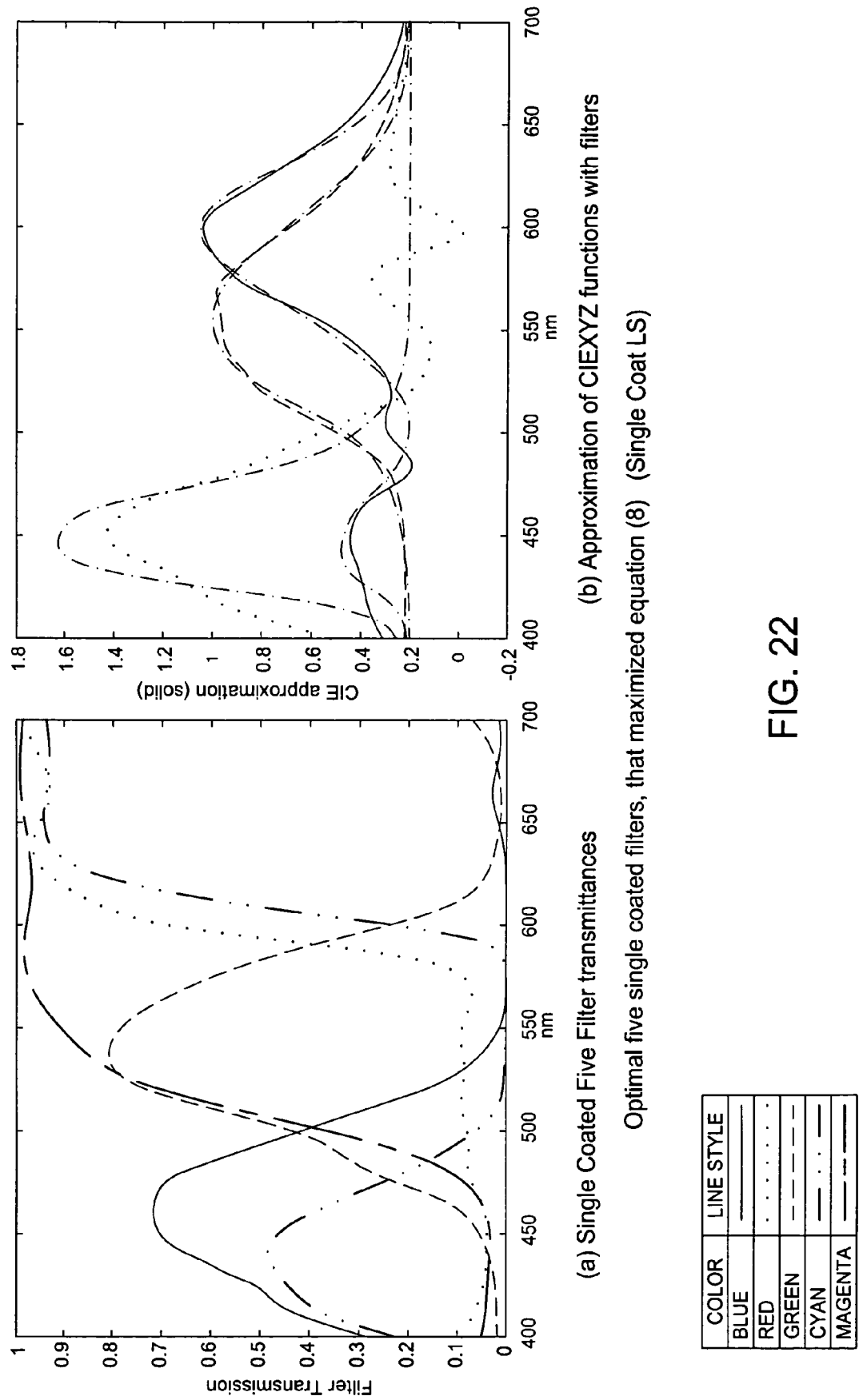
FIG. 22 is a chart showing the optimal five single coated filters that maximized the optimization equation in the computational study.
Figure 23:
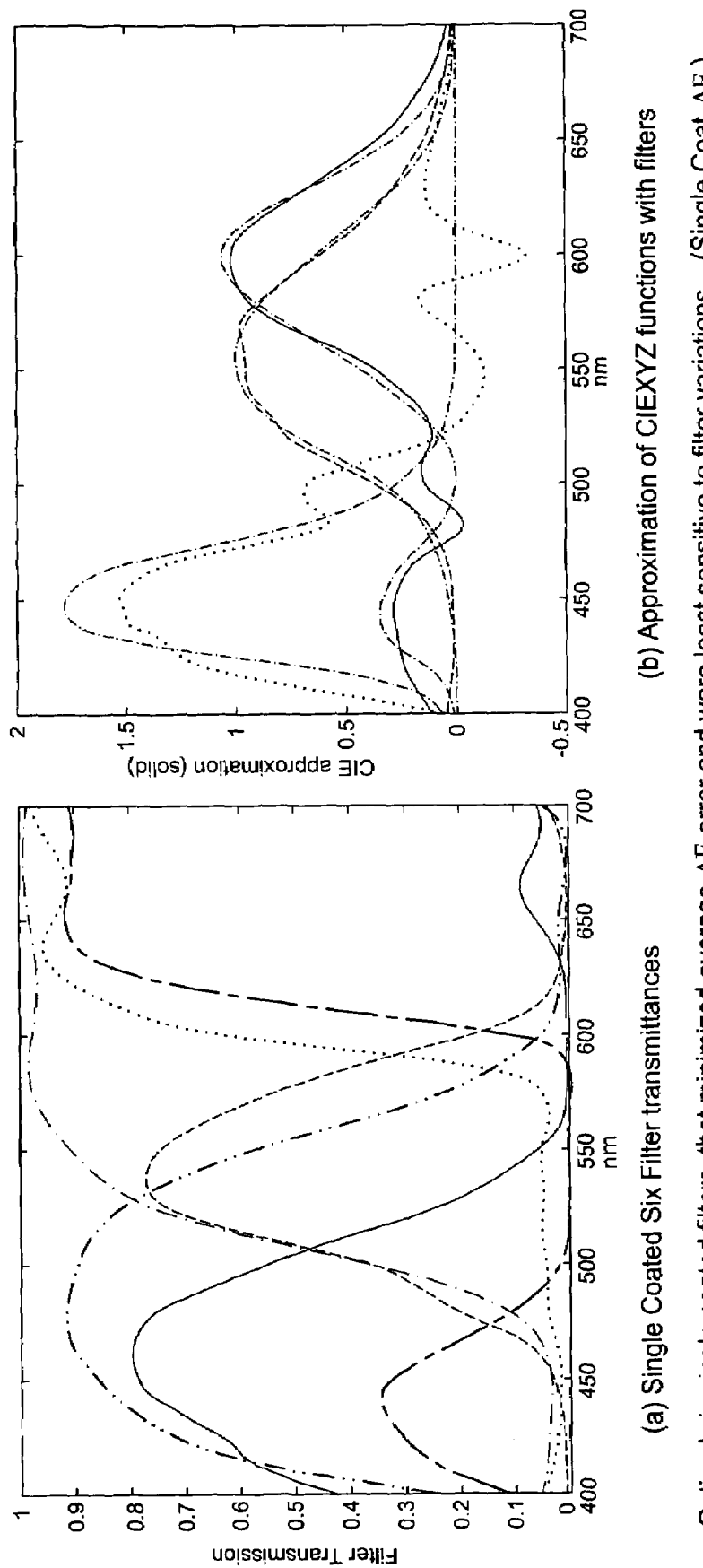
FIG. 23 is a chart showing the optimal six single coated filters that minimized average $\Delta E$ error and were least sensitive to filter variations in the computational study.
Figure 24:
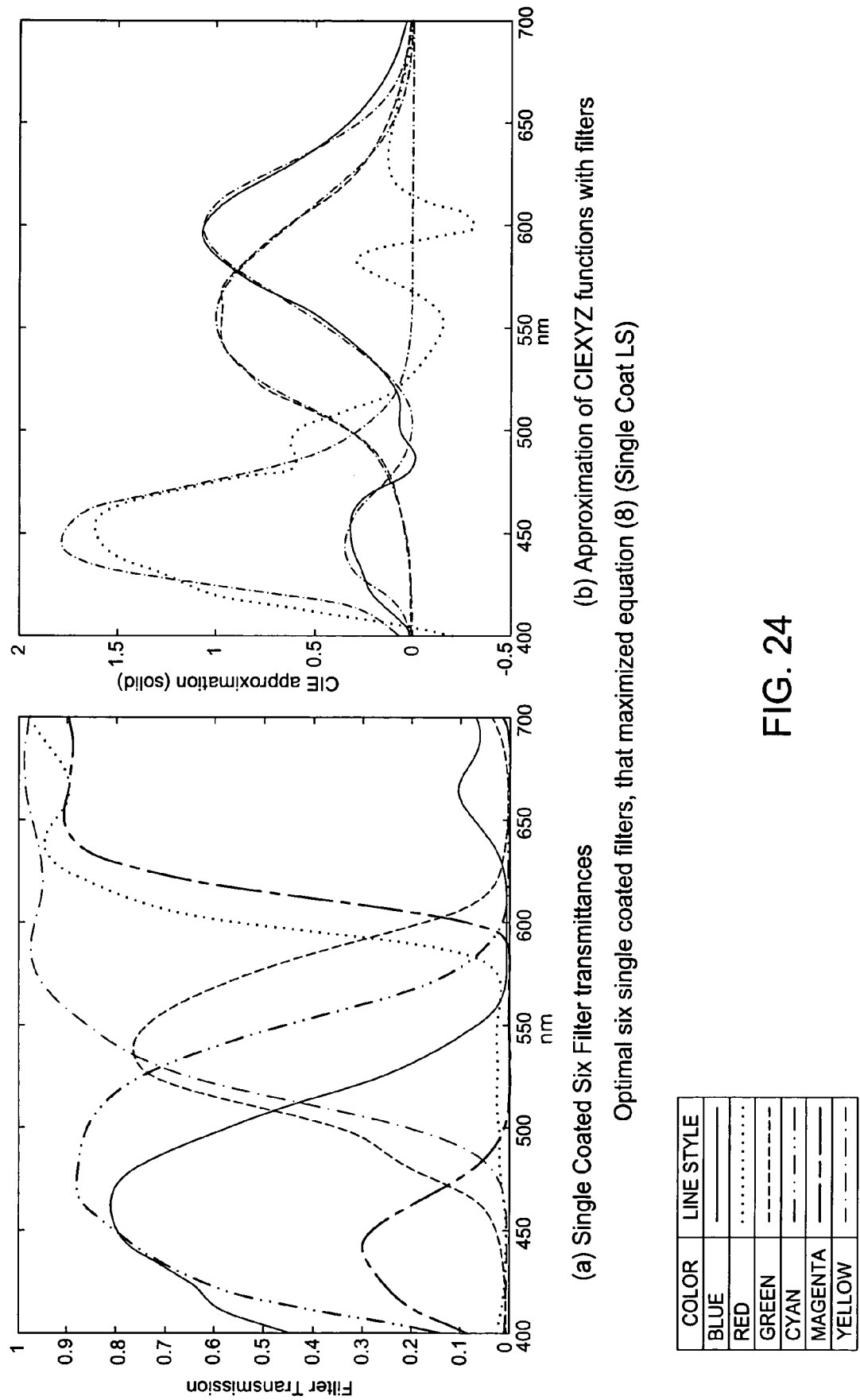
FIG. 24 is a chart showing the optimal six single coated filters that maximized the optimization equation in the computational study.
Figure 27:
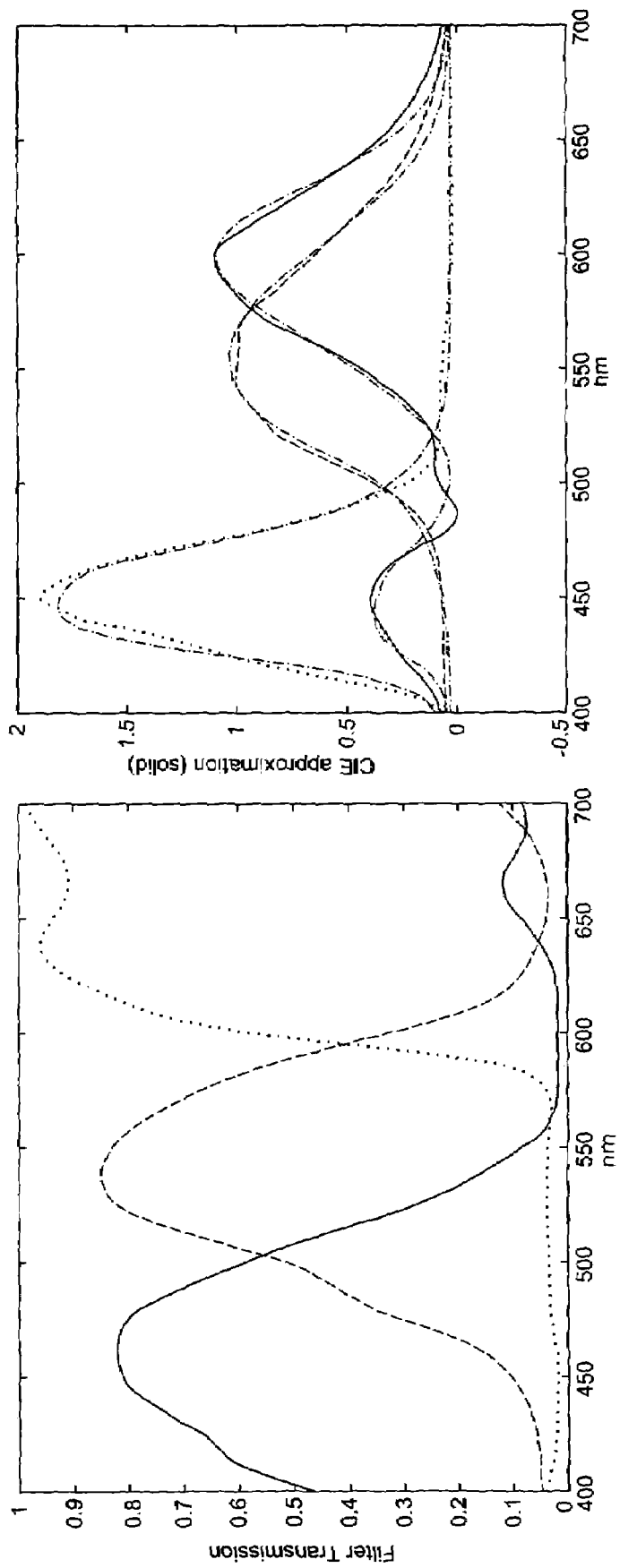
FIG. 27 is a chart showing the optimal three double coated filters that minimized average $\Delta E$ error and were least sensitive to filter variations in the computational study.
Figure 28:
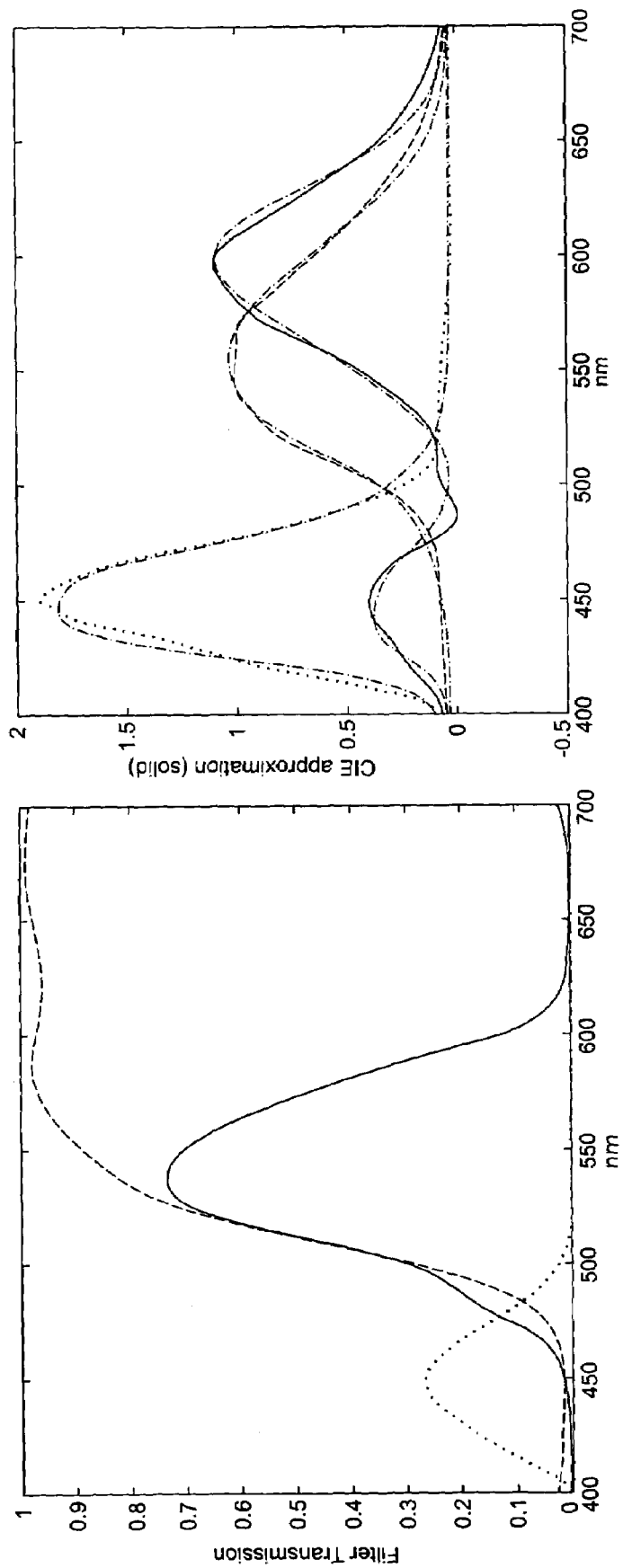
FIG. 28 is a chart showing the optimal three double coated filters that maximized the optimization equation in the computational study.

FIG. 16 is a flow diagram showing an overview of yet another exemplary embodiment of the method 1600 for determining optimal colorant thicknesses for integral CIE color-matching filters. This method 1600 was used in the computational study to solve for the dye densities necessary to obtain the best approximation to the CIE color-matching functions for a fixed number of channels. However, the present invention includes methods for determining optimal colorant thicknesses for integral CIE color-matching filters, which solve a more general design problem than that of the computational study.

This method 1600 was used to determine the following.

7) How to use a given set of filter functions to generate reasonable CIE color-matching functions;
8) The minimum number of filter and detector channels needed to minimize cost;
9) The thickness of each filter layer;
10) Expected performance from the sensor; and
11) How to vary the filter functions to get satisfactory performance and match to the CIE functions.

The approach was as follows.

1) At 1602, select a random initial condition for the colorant concentration (thickness).
2) At 1604, for the given initial conditions, solve the following optimization problem.

$$\max_{c} \frac{\text{Trace}[A^T DOM(M^T DODOM + K_n)^{-1} M^T DOA]}{\text{Trace}[A^T A]} \quad (8)$$

In equation (8), M depends upon c as given in Equation (7) above, c is constrained between [0,3], and $K_n$ is the noise covariance matrix. This quantity is a measure of the overlap between the subspace spanned by the filters and the subspace spanned by the color-matching functions (CMFs).

3) At 1606, clip to zero, values of c that are less than about 0.5 microns.
4) At 1608, if the maximum number of iterations is not reached and the clipping amount was significant, then set the initial conditions to the clipped output (at 1610) and repeat step 2 (1604).
5) At 1612, test the filter performance in terms of a least squares fit, maximum and average ΔE on an ensemble of monitor spectra and in terms of average and maximum ΔE with filter coasting variations of ±0.1 microns.
6) At 1614, if the filter is better than the other tested, then save it.
7) At 1616, return to step 1 (1602) until N random initial conditions are run.

The method 1600 addresses the problem of variation to initial conditions by using a variety of starting points and saving the best results. The problem of the solution set not being continuous is addressed by using iterations.

It is known that multiple coatings of filters increase the cost of the device. Placing a constraint on the number of coatings is a useful technique for simplifying the optimization problem. It was determined that by limiting the number of coatings to one and two coatings, the sensitivity to initial conditions was no longer found to be a significant problem. In addition, it was possible to search all the various one and two coating combinations, maximizing the cost function of equation (8).

Experimental Results

Two linear estimators were designed to map from the recorded values described in method 1600 above to CIE XYZ values. A first linear estimator is a mean square error estimator that uses a priori knowledge of the radiant spectra measured. This estimator was referred to as the linear minimum mean square error (LMMSE) estimator. The second estimator assumed no prior knowledge of the data that is being measured. This estimator was referred to as the projection estimator.

Single Coated Filters

In the study, the simplest case in terms of production and optimization was considered, specifically using single coated filters to achieve the approximations. In this case, each possible single coated filter combination was selected to maximize equation (8). For each combination, different initial conditions were tested in the optimization problem. Across the solutions that the algorithm converges, the filter set that provided the maximum values for equation (8) was selected and was referred to as the Single Coat LS filter set. In addition, the filter set that provided the minimum average ΔE error on an ensemble of radiant spectra in the presence of filter variations was selected. This filter set was referred to as the single coat ΔE filter set. The decision of which filter set was optimal in an experiment was based upon a signal-to-noise ratio (SNR) of about 50 dB for a mid-level gray scale monitor output. The projection estimator was used for the computation.

FIGS. 17, 19, 21, and 23 show charts of the single coated filters for sets of 3 to 6 filters that minimized average ΔE error and were least sensitive to filter variations with their approximation to the CIE XYZ color-matching functions. FIGS. 18, 20, 22, and 24 show charts of the single coated filters for sets of 3 to 6 filters that maximize the optimization equation of the present invention with their approximation to the CIE XYZ color-matching functions. The coating thickness values for the filter sets are contained in Tables VII-IX, which are shown in FIGS. 39-41. Tables I-II shown in FIGS. 25 and 26 show the ΔE performance of the filters using the projection and LMMSE transformation methods. The values in these tables are interpreted as follows. Nominal $\Delta E_{max}$ is the maximum ΔE value across an ensemble of radiant monitor spectra for the filter set with its specified coating. Nominal $\Delta E_{avg}$ is the average ΔE value across an ensemble of radiant monitor spectra for the filter set with its specified coating. Deviation MAX $\Delta E_{max}$ is the maximum ΔE value across an ensemble of radiant monitor spectra for the filter set with all ±0.1 micron variations from the specified coating. Deviation MAX $\Delta E_{avg}$ is the maximum taken across all ±0.1 micron variations from the specified coating of the average ΔE value across an ensemble of radiant monitor spectra.

The single coated filters provided a poor approximation to the CIE XYZ color-matching functions. This was reflected both graphically as well as in the simulated performance with the projection transformation in Table I shown in FIG. 25. As such, it was not recommended that solely single coated filters be used for approximating CIE color-matching functions.

Double Coated Filters

The next level of complexity in the study was to consider double coating of the filters. For this case, each possible double coated filter combination was optimized by maximizing equation (8) for filter sets of sizes 3 to 5. The filter set that provided the maximum values for equation (8) was referred to as the Double Coat LS filter set. In an experiment, from the top 1000 filter sets that were computed by this approach, the filter set that provided the minimum average ΔE error on an ensemble of radiant spectra in the presence of filter variations was determined. This filter set was referred to as the Double Coat ΔE filter set. FIGS. 27-32 show charts of the filter transmittances and their approximation to the CIE XYZ color-matching functions. FIGS. 33 and 34 show Tables III-IV of the colorimetric performance of the filters using the projection and LMSE transformation methods. The coating thickness values for each filter set are again given in Tables VII-IX shown in FIGS. 39-41.

Figure 29:
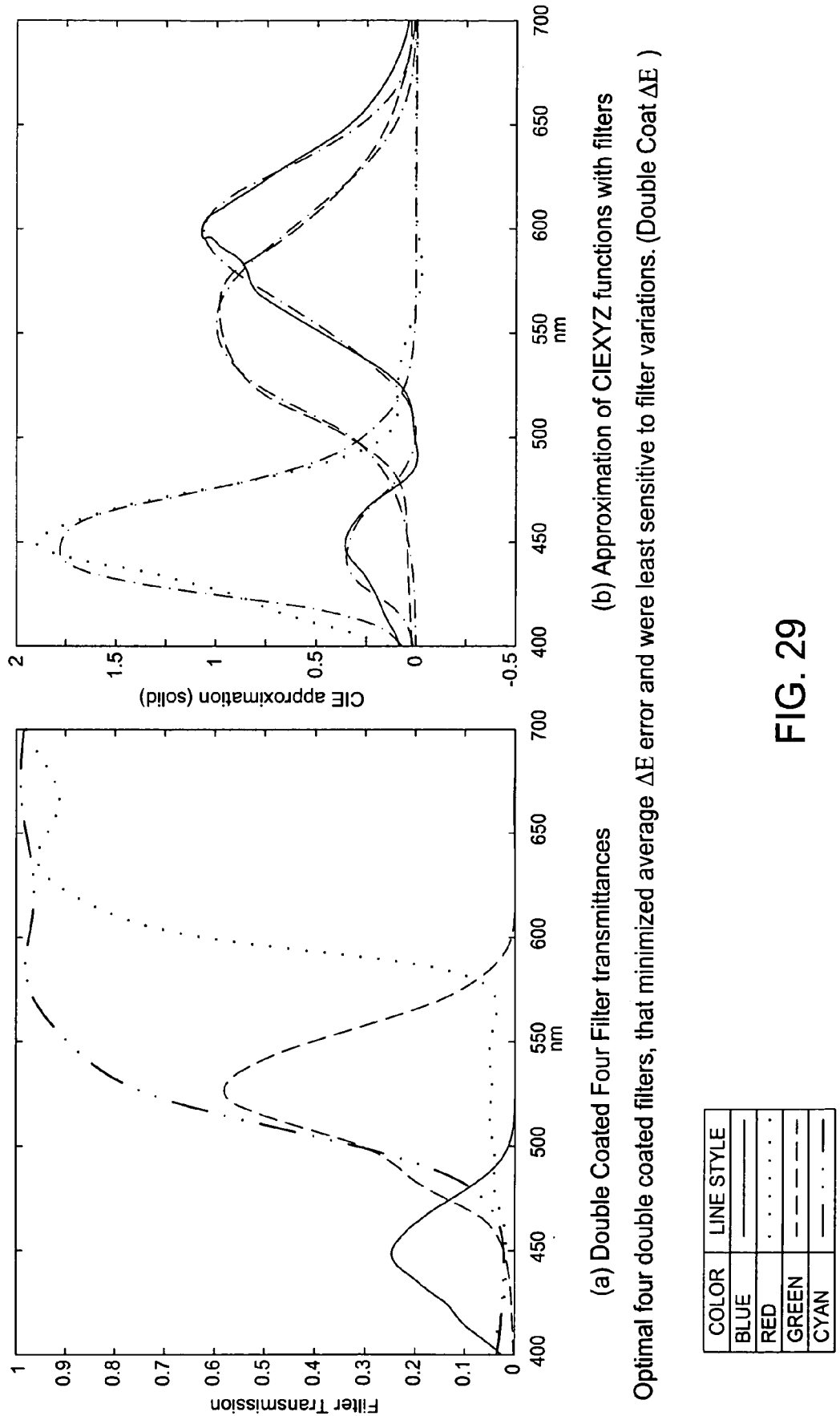
FIG. 29 is a chart showing the optimal four double coated filters, which minimized average $\Delta E$ error and were least sensitive to filter variations in the computational study.
Figure 30:
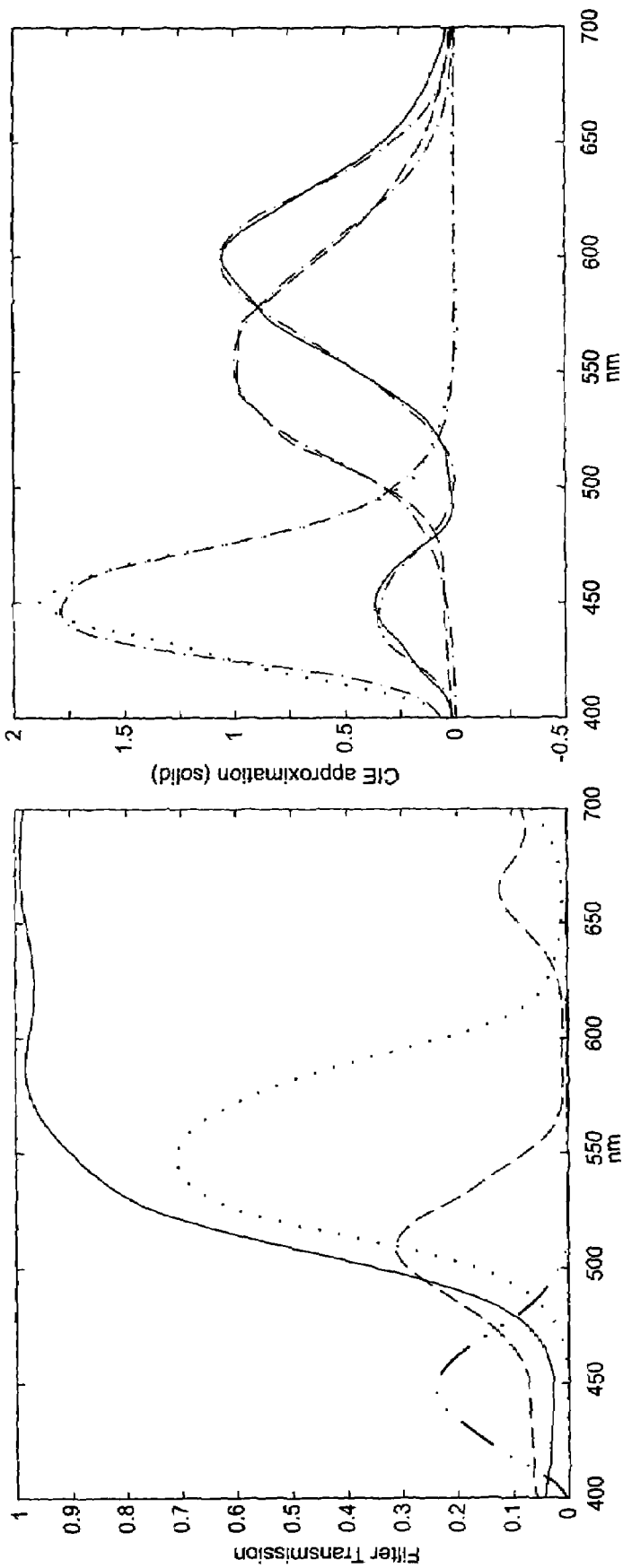
FIG. 30 is a chart showing the optimal four double coated filters that maximized the optimization equation in the computational study.
Figure 31:
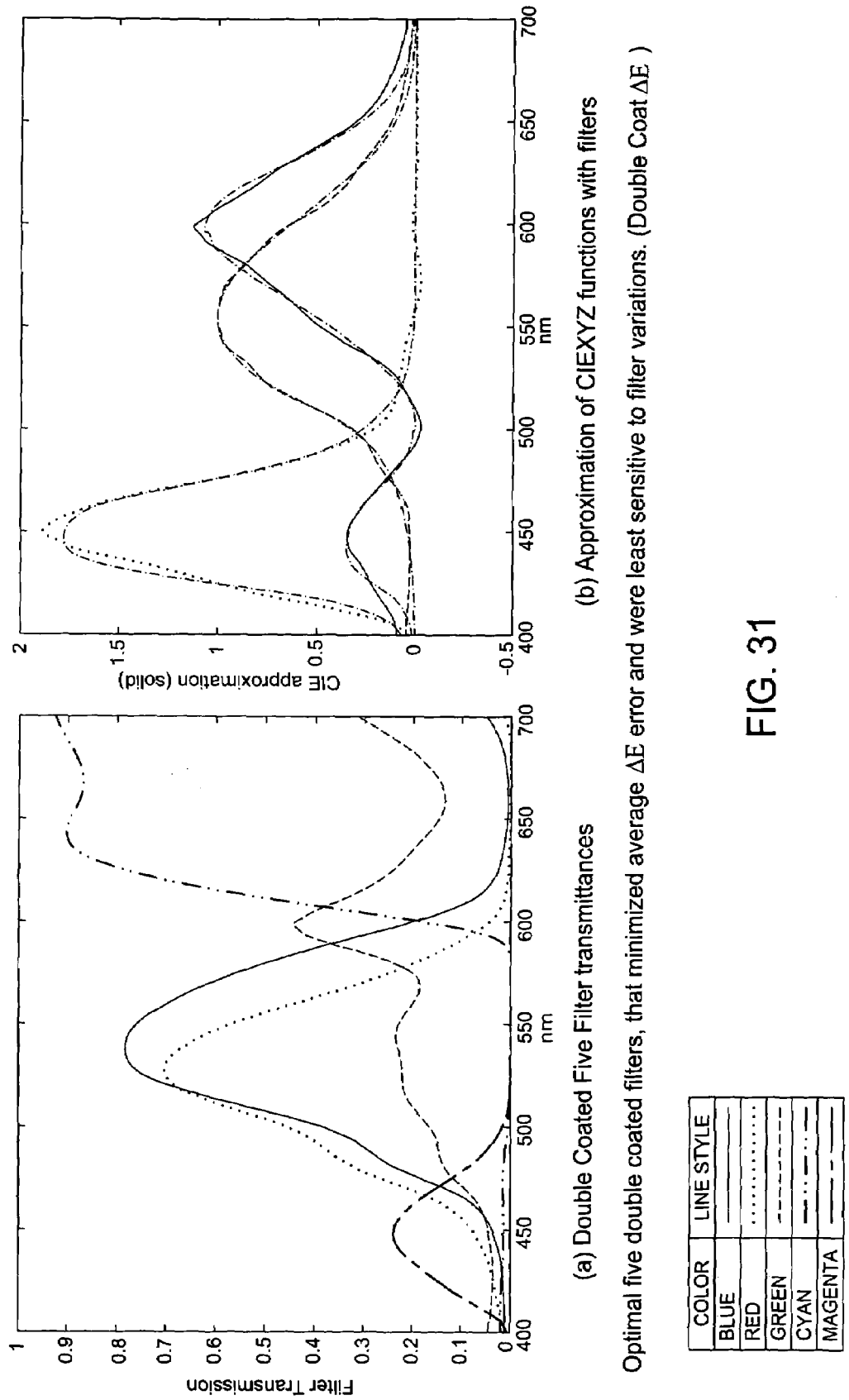
FIG. 31 is a chart showing the optimal five double coated filters that minimized average $\Delta E$ error and were least sensitive to filter variations in the computational study.
Figure 32:
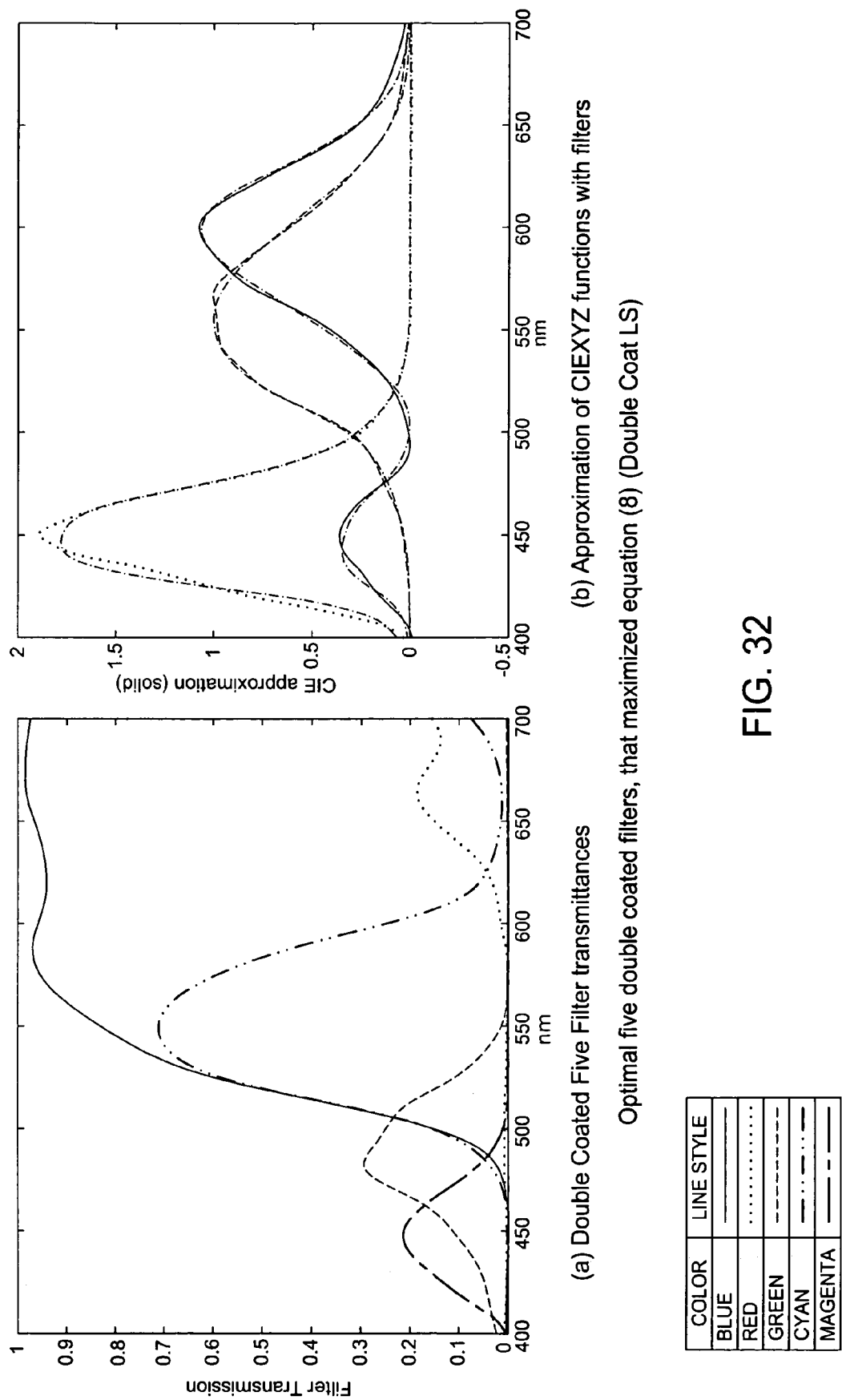
FIG. 32 is a chart showing the optimal five double coated filters that maximized the optimization equation in the computational study.

A conclusion in the study was that with only double coating, a good match to the CIE XYZ color-matching functions was feasible with a four band device. Both FIGS. 29 and 30 illustrate that four double coated filters provided a reasonable approximation for CIE color-matching. In addition, the improvement from adding a fifth filter was very small.

Figure 35:
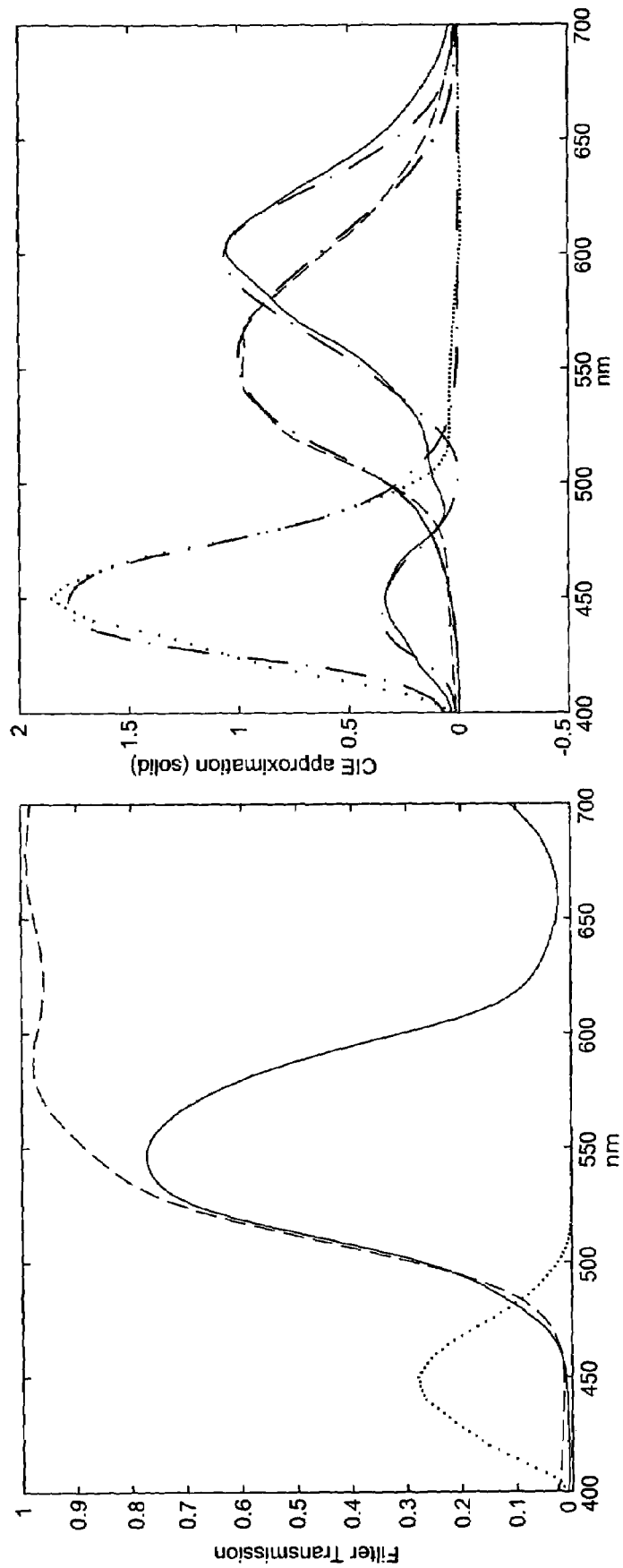
FIG. 35 is a chart showing the optimal three multi-coated filters that minimized average $\Delta E$ error and were least sensitive to filter variations in the computational study.
Figure 36:
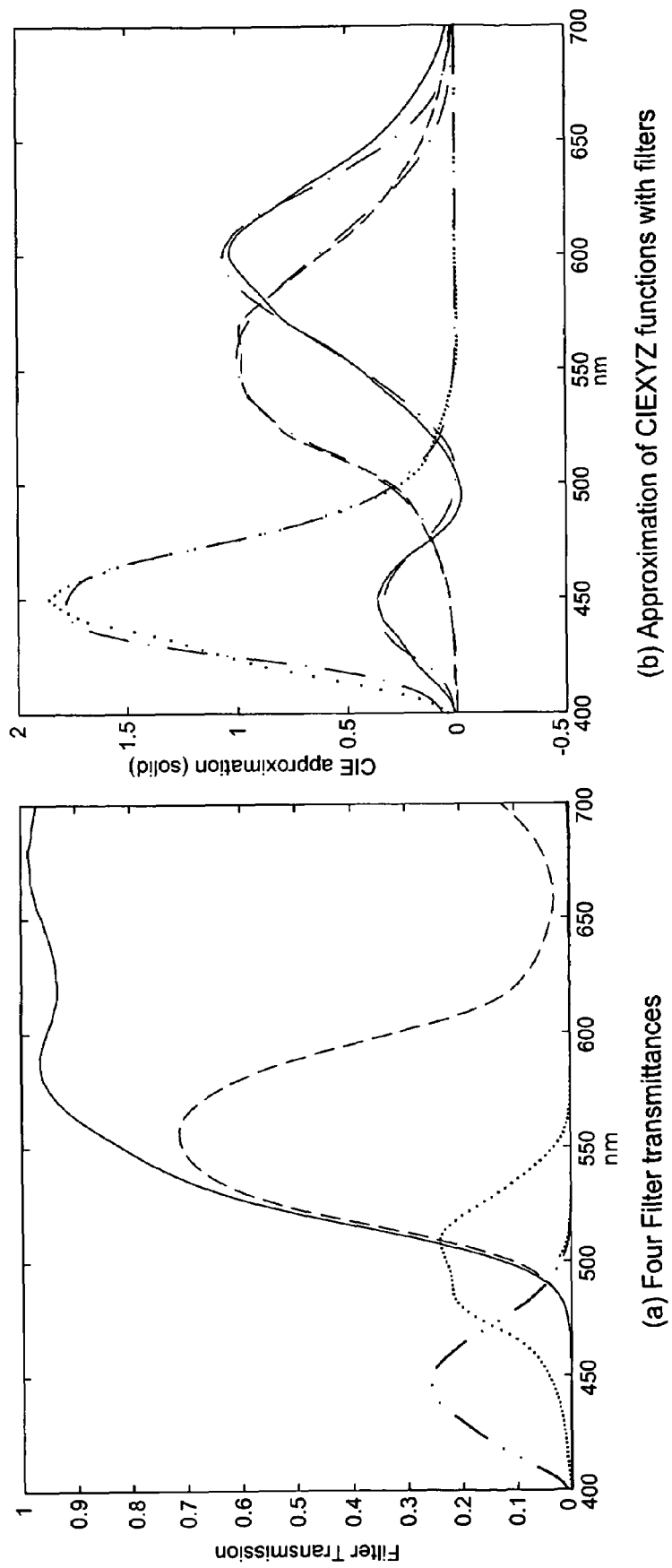
FIG. 36 is a chart showing the optimal four multi-coated filters that minimized average $\Delta E$ error and were least sensitive to filter variations in the computational study.

In the study, the final and most difficult optimization problem was one that allowed the use of up to six coatings of each of the dye types. For this case, in an experiment, sets of 3 and 4 optimal filters were computed. Due to the complexity of the problem and the goodness of fit achieved at the lower filter counts, simulations were not performed beyond a filter size of 4 for the multi-coated case. For a set of 50 random starting conditions, the iterative optimization method of FIG. 16 was solved. From 50 initial conditions, the filter set that provided the minimum average ΔE error on an ensemble of radiant spectra in the presence of filter variations was selected. This filter set is referred to as the Min ΔE filter set. The decision of what filter set was optimal was based upon an SNR of 50 dB for a mid-level gray scale monitor output. The projection estimator was used for the computation. FIGS. 35 and 36 show the selected filters and their approximation to the CIE XYZ color-matching functions. Tables V and VI shown in FIGS. 37 and 38 illustrate the ΔE performance of the filters using the LMMSE and projection transformation methods. The coating thickness values for each filter set are listed in Tables VII-VIII, shown in FIGS. 39 and 40.

In the study, the coating levels that were arrived at in this unconstrained approach were examined and it was determined that the solution arrived at one of the double coated solutions. In addition, the solution was suboptimal to the double coating solution. This is due to the number of local extrema that exist in the unconstrained coating optimization problem.

The results of the computational study may be used in various applications including color measuring applications. For example, the determined integral dye filters of the present invention may be permanently deposited on the surface of photoelectric sensors of a color measuring device for measuring display devices such as monitors. As such, a color measuring device including the determined dye filters of the present invention may be implemented as a colorimetric monitor calibrator. The filters of the present invention may also be implemented in a colorimeter as described in U.S. patent application No. 6,163,377. In such an application, the dye filters of the present invention would be integrated as part of the photoelectric sensors of the colorimeter. The study included various experiments using an IR filter such as an IR filter disclosed in the spectral model.

The exemplary embodiments of methods for determining the optimal dye thicknesses for integral CIE color-matching filters can be used to design a colorimetric monitor calibrator. Assuming the SNR is sufficiently high, a four band device could easily meet the requirements for color accuracy. The SNR levels were assumed to be for a mid-level gray from the monitor.

In an alternate embodiment of the present invention, a four band filter set may be accomplished having the recommended coatings denoted by Double Coat LS shown in FIG. 30. According to the computational study, this will provide the best approximation to the CIE XYZ color-matching functions with the least cost. The four band filter set verifies that Beer's law was not significantly departed from. It should be noted, however, that for this filter set, there is one filter that contains a blue and yellow coating. This will result in a transmittance that is fairly low in a spectral region of lower sensitivity for the detector.

Figure 42:
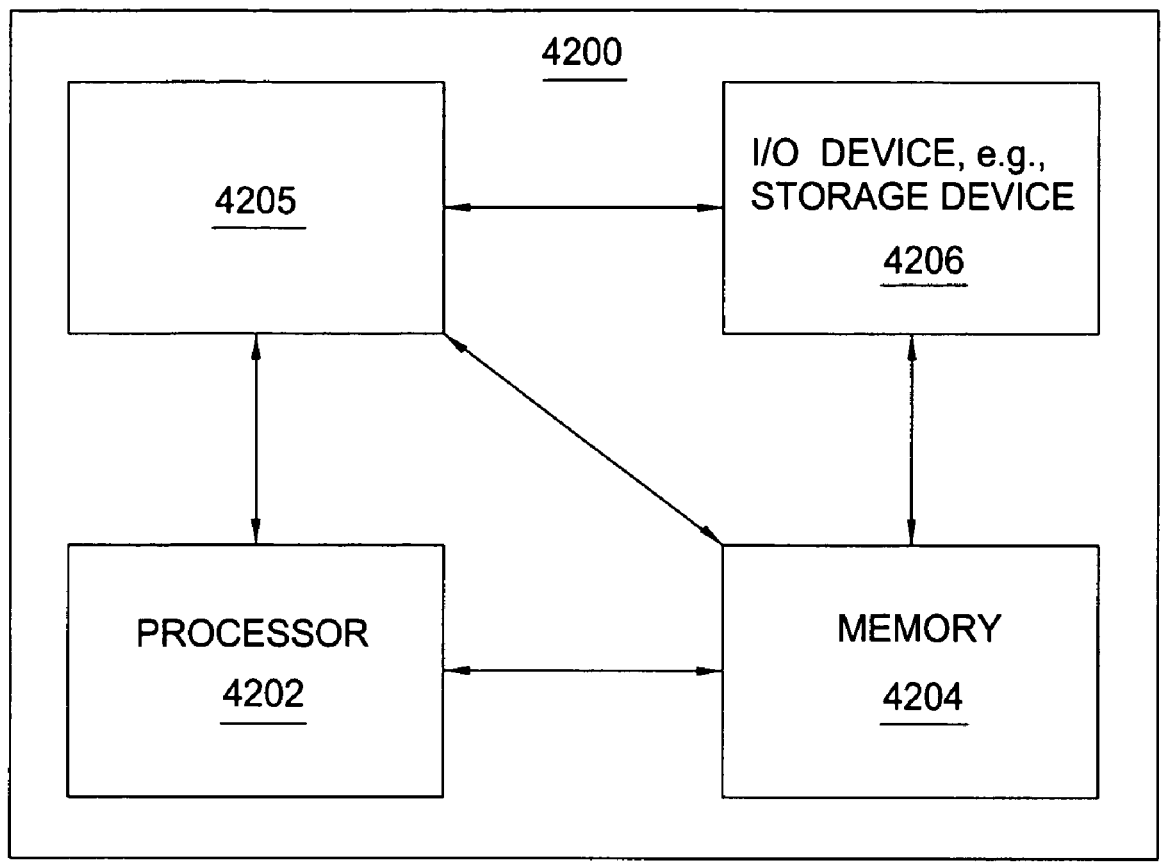
FIG. 42 is a high level block diagram of a general purpose computer suitable for use in performing the functions described herein.

FIG. 42 is a high level block diagram of a general purpose computer suitable for use in performing the functions described herein. In FIG. 42, the system 4200 comprises a processor element 4202 (e.g., a CPU), a memory 4204, e.g., random access memory (RAM) and/or read only memory (ROM), an exemplary embodiment of the method for designing a colorimeter having integral CIE color-matching filters, including determining optimal colorant thicknesses 4205, and various input/output devices 4206 (e.g., storage devices, including but not limited to, a tape drive, a floppy drive, a hard disk drive or a compact disk drive, a receiver, a transmitter, a speaker, a display, a speech synthesizer, an output port, and a user input device, such as a keyboard, a keypad, a mouse, and the like).

Exemplary embodiments of the present invention can be implemented in software and/or in a combination of software, firmware, and/or hardware, e.g., using application specific integrated circuits (ASIC), a general purpose computer or any other hardware equivalents. In one embodiment, the method 4205 can be loaded into memory 4204 and executed by processor 4202 to implement the functions as discussed above. As such, the method 4205 (including associated data structures) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

What is claimed is:

1. A method for designing a colorimeter having integral CIE-like color-matching filters, comprising:
   determining a set of channels from a plurality of channels;
   determining a set of filters, each filter being permanently deposited on each of the channels, each filter being an absorptive filter, each filter having at least one layer, at least one channel having at least one filter with a double layer so that a linear combination of the set of channels matches a set of CIE-like target color-matching functions within a tolerance, each channel integrating at least one detector and at least one filter onto a single semiconductor substrate;
   determining a colorant for each layer on each channel from a set of colorants; and
   determining a thickness of each layer on each channel.

2. The method of claim 1, further comprising:
   determining the linear combination of channels to approximate each of the CIE-like target color-matching functions in the set of CIE-like target color-matching functions.

3. The method of claim 1, wherein the channels are substantially identical prior to attachment of the filters.

4. The method of claim 1, wherein the selection of the colorant for each channel and the colorant thickness for each layer on each channel is performed by:
   generating a set of potential solutions, the set of potential solutions including the set of colorants to be apportioned in colorant layers to comprise the filter for each channel, a particular number of colorant layers for each filter, and a thickness of each colorant layer for each channel.

5. The method of claim 4, further comprising:

selecting a solution from the set of potential solutions by minimizing the number of channels needed to match the CIE-like target color-matching functions within the tolerance, by minimizing the number of colorant layers per channel without increasing the number of channels needed to match the CIE-like target color-matching functions within the tolerance, and by minimizing deviations in performance under the influence of colorant layer thickness variations; and providing the solution, the solution including the set of channels, the colorant for each layer of each channel, and the thickness of each layer needed to match the CIE-like target color-matching functions within the tolerance.

6. The method of claim 5, wherein selecting the solution further comprises:

optimizing colorant selection end layer thicknesses for a best match to the CIE-like target color-matching functions; and optimizing channel coefficients for the best match to the CIE-like target color-matching functions.

7. The method of claim 5, wherein selecting the solution further comprises:

testing the potential solutions for layer thickness variation;

sorting the potential solutions by a figure of merit value;

selecting the solution from the potential solutions by configuration type and layer structure.

8. The method of claim 5, wherein matching the CIE-like target color-matching functions within the tolerance includes computing an error measure for a test monitor spectra.

9. The method of claim 5, further comprising:

comparing and storing results for the potential solutions.

10. The method of claim 5, further comprising:

providing a plot of the solution and the target color-matching functions.

11. The method of claim 5, further comprising:

providing quantitative color differences between the solution and the target color-matching functions.

* * * * *